US011973573B2

(12) United States Patent
Fujii et al.

(10) Patent No.: US 11,973,573 B2
(45) Date of Patent: Apr. 30, 2024

(54) COMMUNICATION RELAY APPARATUS, SYSTEM, INTERFERENCE SUPPRESSION METHOD AND PROGRAM

(71) Applicant: SoftBank Corp., Tokyo (JP)

(72) Inventors: Takafumi Fujii, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/261,729

(22) PCT Filed: Jan. 12, 2022

(86) PCT No.: PCT/JP2022/000736
§ 371 (c)(1),
(2) Date: Jul. 17, 2023

(87) PCT Pub. No.: WO2022/154012
PCT Pub. Date: Jul. 21, 2022

(65) Prior Publication Data
US 2024/0014889 A1    Jan. 11, 2024

(30) Foreign Application Priority Data

Jan. 18, 2021 (JP) ................................. 2021-005923

(51) Int. Cl.
*H04B 7/185* (2006.01)
(52) U.S. Cl.
CPC ................................. *H04B 7/18513* (2013.01)
(58) Field of Classification Search
CPC ..... H04B 17/21; H04B 17/14; H04L 25/0204; H04L 1/0047; H04L 25/024; H04W 24/02;

(Continued)

(56) References Cited

U.S. PATENT DOCUMENTS

2016/0046387 A1    2/2016  Frolov et al.

FOREIGN PATENT DOCUMENTS

JP       2020-141387 A     9/2020

OTHER PUBLICATIONS

Takafumi Fujii, et al., "A Study on Interference Cancelation for Reverse-Link in HAPS Multi-Gateway Feeder Link System," Sep. 10, 2019, 2019 IEICE.

(Continued)

*Primary Examiner* — Khalid W Shaheed
(74) *Attorney, Agent, or Firm* — Muirhead and Saturnelli, LLC

(57) ABSTRACT

It is prevented of degradation of communication quality caused by estimation errors of plural path differences between plural antennas for feeder link (FL antennas) incorporated in an aerial-staying type communication relay apparatus and plural gateway (GW) stations. The aerial-staying type communication relay apparatus estimates plural first path differences $\Delta d_{ji}$ respectively between the plural GW stations and the plural FL antennas with reference to a main path, based on plural pilot reception signals received from the plural GW stations, obtains plural correction values corresponding to the plural first path differences, based on the plural pilot reception signals, estimates a propagation path response in the transmission signal band of the feeder link, based on plural corrected second path differences $\Delta_{dji\_new}$ obtained by respectively correcting the plural first path differences with plural correction values, calculates and stores reception weights for suppressing interference signals, and applies the plural reception weights to reception signals received via the plural antennas for feeder link, with respect to each of the plural gateway stations.

20 Claims, 21 Drawing Sheets

(58) Field of Classification Search
CPC ............. H04W 52/243; H04W 52/223; H04W 52/242; H04W 24/08; H04W 16/18; H04W 16/14
See application file for complete search history.

(56) References Cited

OTHER PUBLICATIONS

Takafumi Fujii, et al., "A Study on Efficient Spectrum Utilization for Feeder Link using Multipe Gateways in HAPS System," IEICE Technical Report, RCS2018-203, Nov. 2018.
International Preliminary Report on Patentability, dated Jul. 4, 2023.

COMMUNICATION RELAY APPARATUS, SYSTEM, INTERFERENCE SUPPRESSION METHOD AND PROGRAM

TECHNICAL FIELD

The present invention relates to an improvement of a dynamic-propagation spatial correlation by changing a position of HAPS-mounted antennas in a multi-feeder link of an aerial-floating type radio relay apparatus such as a HAPS suitable for constructing a three-dimensional network.

BACKGROUND ART

There is conventionally known a communication relay apparatus such as a high altitude platform station (HAPS) (also referred to as "high altitude pseudo satellite") that can float and stay in an airspace and an artificial satellite (for example, see Patent Literature 1). A communication line in this aerial-floating type communication relay apparatus is configured with a feeder link between the communication relay apparatus and a gateway (GW) station on a mobile communication network side, and a service link between the communication relay apparatus and a terminal apparatus.

The present applicant has proposed a communication system capable of improving the effective use of frequencies in the feeder link of the aerial-floating type communication relay apparatus (hereinafter referred to as "upper-airspace relay apparatus") (see Patent Literature 2). This communication system is provided with plural gateway stations that perform space-division multiplex communication for transmitting and receiving relay signals different from each other on the same frequency in the feeder link with the upper-airspace relay apparatus. Each of the plural gateway stations transmits plural pilot signals with frequencies different from each other. The upper-airspace relay apparatus calculates plural path differences between each of the plural gateway stations and the plural antennas for feeder link of the upper-airspace relay apparatus to estimate propagation path responses and calculate weights, based on the reception result of receiving plural pilot signals transmitted from each of the plural gateway stations. According to this communication system, by using the calculated weights, it is possible to reduce interference between plural feeder links in feeder link communication between the upper-airspace relay apparatus and the plural gateway stations.

CITATION LIST

Patent Literature

Patent Literature 1: U.S. Patent Application Publication No. 2016/0046387.
Patent Literature 2: Japanese Unexamined Patent Publication No. 2020-141387.

SUMMARY OF INVENTION

Technical Problem

As a result of diligent research on interference reduction performance between feeder links in the foregoing communication system, the inventors of the present invention have found the following problems to be further improved. That is, it has been found that the communication quality may be deteriorate because interference between plural feeder links cannot be reduced accurately due to errors in the path difference used for estimating the propagation path response.

Solution to Problem

A communication relay apparatus according to an aspect of the present invention is an aerial-staying type communication relay apparatus including a repeater-type relay communication station for relaying radio communication of a terminal apparatus and plural antennas for feeder link. This communication relay apparatus comprises a feeder-link communication section for transmitting and receiving relay signals different from each other on a same frequency in a feeder link to and from plural gateway stations that are time-synchronized with each other, via plural antennas for feeder link, and an interference suppression section for suppressing an interference between plural feeder links formed with the plural gateway stations. The interference suppression section comprises means for retrieving plural pilot reception signals corresponding to plural pilot signals transmitted respectively from the plural gateway stations in a frequency band adjacently outside a transmission signal band of the feeder link, from reception signals received via the plural antennas for feeder link, means for estimating plural first path differences respectively between the plural gateway stations and the plural antennas for feeder link with reference to a main path, based on the plural pilot reception signals, means for obtaining plural correction values respectively corresponding to each of the plural first path differences, based on the plural pilot reception signals, means for estimating a propagation path response in the transmission signal band of the feeder link based on plural corrected second path differences obtained by respectively correcting the plural first path differences with the plural correction values, means for calculating and storing plural reception weights based on the estimation result of the propagation path response, with respect to each of the plural gateway stations, and means for applying the plural reception weights to reception signals received via the plural antennas for feeder link, with respect to each of the plural gateway stations.

In the foregoing communication relay apparatus, the interference suppression section, with respect to each of the plural gateway stations, may calculate and store plural reception weights and plural transmission weights based on the estimation result of the propagation path response, apply the plural reception weights to reception signals received via the plural antennas for feeder link, and apply the plural transmission weights to transmission signals to be transmitted via the plural antennas for feeder link.

A communication relay apparatus according to another aspect of the present invention is an aerial-staying type communication relay apparatus a repeater-type relay communication station for relaying radio communication of a terminal apparatus and plural antennas for feeder link. This communication relay apparatus comprises a feeder-link communication section for transmitting and receiving relay signals different from each other on a same frequency in a feeder link to and from plural gateway stations that are time-synchronized with each other, via plural antennas for feeder link, and an interference suppression section for suppressing an interference between plural feeder links formed with the plural gateway stations. The interference suppression section comprises means for retrieving plural pilot reception signals corresponding to plural pilot signals transmitted respectively from the plural gateway stations in a frequency band adjacently outside a transmission signal band of the feeder link, from reception signals received via the plural antennas for feeder link, means for estimating plural first path differences respectively between the plural gateway stations and the plural antennas for feeder link with reference to a main path, based on the plural pilot reception signals, means for obtaining plural correction values respectively corresponding to the plural first path differences, based on the plural pilot reception signals, means for estimating a propagation path response in the transmission signal band of the feeder link based on plural corrected second path differences obtained by respectively correcting the plural first path differences with the plural correction values, means for calculating and storing plural transmission weights based on an estimation result of the propagation path response, with respect to each of the plural gateway stations, and means for applying the plural transmission weights to transmission signals to be transmitted via the plural antennas for feeder link, with respect to each of the plural gateway stations.

A system according to yet another aspect of the present invention comprises any one of the foregoing communication relay apparatus, and plural gateway stations that are time-synchronized with each other and that transmit and receive relay signals different from each other on the same frequency in a feeder link to and from the relay communication station of the aerial-staying type communication relay apparatus.

An interference suppression method according to yet another aspect of the present invention is an interference suppression method of feeder links between a repeater-type relay communication station that is incorporated in an aerial-staying type communication relay apparatus and relays a radio communication of a terminal apparatus, and plural gateway stations that are time-synchronized with each other and transmit and receive relay signals different from each other on a same frequency. This interference suppression method comprises retrieving plural pilot reception signals corresponding to plural pilot signals transmitted respectively from the plural gateway stations in a frequency band adjacently outside a transmission signal band of the feeder link, from reception signals received via plural antennas for feeder link, estimating plural first path differences respectively between the plural gateway stations and the plural antennas for feeder link with reference to a main path, based on the plural pilot reception signals, obtaining plural correction values respectively corresponding to the plural first path differences, based on the plural pilot reception signals, estimating a propagation path response in the transmission signal band of the feeder link based on plural corrected second path differences obtained by respectively correcting the plural first path differences with the plural correction values, calculating and storing plural reception weights based on an estimation result of the propagation path response, with respect to each of the plural gateway stations, and applying the plural reception weights to reception signals received via the plural antennas for feeder link, with respect to each of the plural gateway stations.

In the foregoing interference suppression method, the interference suppression method may comprises, with respect to each of the plural gateway stations, calculating and storing plural reception weights and plural transmission weights based on the estimation result of the propagation path response, applying the plural reception weights to reception signals received via the plural antennas for feeder link, and applying the plural transmission weights to transmission signals to be transmitted via the plural antennas for feeder link.

An interference suppression method according to yet another aspect of the present invention is an interference suppression method of feeder links between a repeater-type relay communication station that is incorporated in an aerial-staying type communication relay apparatus and relays a radio communication of a terminal apparatus, and plural gateway stations that are time-synchronized with each other and transmit and receive relay signals different from each other on a same frequency. This interference suppression method comprises retrieving plural pilot reception signals corresponding to plural pilot signals transmitted respectively from the plural gateway stations in a frequency band adjacently outside a transmission signal band of the feeder link, from reception signals received via plural antennas for feeder link, estimating plural first path differences respectively between the plural gateway stations and the plural antennas for feeder link with reference to a main path, based on the plural pilot reception signals, obtaining plural correction values respectively corresponding to the plural first path differences, based on the plural pilot reception signals, estimating a propagation path response in the transmission signal band of the feeder link based on plural corrected second path differences obtained by respectively correcting the plural first path differences with the plural correction values, calculating and storing plural transmission weights based on an estimation result of the propagation path response, with respect to each of the plural gateway stations, and applying the plural transmission weights to transmission signals to be transmitted via the plural antennas for feeder link, with respect to each of the plural gateway stations.

A program according to yet another aspect of the present invention is a program executed by a computer or a processor installed in an aerial-staying type communication relay apparatus having a repeater-type relay communication station for relaying radio communication of a terminal apparatus and plural antennas for feeder link. This program comprises a program code for retrieving plural pilot reception signals corresponding to plural pilot signals transmitted respectively from the plural gateway stations in a frequency band adjacently outside a transmission signal band of a feeder link, from reception signals received via plural antennas for feeder link, a program code for estimating plural first path differences respectively between the plural gateway stations and the plural antennas for feeder link with reference to a main path, based on the plural pilot reception signals, a program code for obtaining plural correction values respectively corresponding to the plural first path differences, based on the plural pilot reception signals, a program code for estimating a propagation path response in the transmission signal band of the feeder link based on plural corrected second path differences obtained by respectively correcting the plural first path differences with the plural correction values, a program code for calculating and storing plural reception weights based on an estimation result of the propagation path response, with respect to each of the plural gateway stations, and a program code for applying the plural reception weights to reception signals received via the plural antennas for feeder link, with respect to each of the plural gateway stations.

In the foregoing program, the program may comprise, with respect to each of the plural gateway stations, a program code for calculating and storing plural reception weights and plural transmission weights based on the estimation result of the propagation path response, applying the plural reception weights to reception signals received via the plural antennas for feeder link, and applying the plural transmission weights to transmission signals to be transmitted via the plural antennas for feeder link.

A program according to yet another aspect of the present invention is a program executed by a computer or a processor installed in an aerial-staying type communication relay apparatus having a repeater-type relay communication station for relaying radio communication of a terminal apparatus and plural antennas for feeder link. This program comprises a program code for retrieving plural pilot reception signals corresponding to plural pilot signals transmitted respectively from the plural gateway stations in a frequency band adjacently outside a transmission signal band of a feeder link, from reception signals received via the plural antennas for feeder link, a program code for estimating plural first path differences respectively between the plural gateway stations and the plural antennas for feeder link with reference to a main path, based on the plural pilot reception signals, a program code for obtaining plural correction values respectively corresponding to the plural first path differences based on the plural pilot reception signals, a program code for estimating a propagation path response in the transmission signal band of the feeder link based on plural corrected second path differences obtained by respectively correcting the plural first path differences with the plural correction values, a program code for calculating and storing plural transmission weights based on an estimation result of the propagation path response, with respect to each of the plural gateway stations, and a program code for applying the plural transmission weights to transmission signals to be transmitted via the plural antennas for feeder link, with respect to each of the plural gateway stations.

In the foregoing communication relay apparatus, the foregoing interference suppression method and the foregoing program, the communication relay apparatus, the interference suppression method and the program, with respect to each of the plural first path differences, it may be obtained of a difference between two pilot reception signals respectively corresponding to the main path and the other path of the first path difference, while changing a phase difference of one of the two pilot reception signals relative to the other pilot reception signal, and it may be obtained of a correction value corresponding to the first path difference based on the phase difference when the difference between the two pilot reception signals is minimized.

In the foregoing communication relay apparatus, the foregoing interference suppression method and the foregoing program, an amplitude of at least one of the two reception pilot signals may be adjusted so that amplitudes of the two reception pilot signals become a same value as each other.

In the foregoing communication relay apparatus, the foregoing interference suppression method and the foregoing program, when a frequency of the pilot reception signal is f [Hz], a wavelength of the pilot reception signal is λ [m], and the first path difference is Δd [m], a ratio of absolute values of the amplitudes of the two pilot reception signals is γ, a correction angle of the phase difference to be changed is ε [degrees], and light velocity is c [m/s], it may be obtained of a value of error function E(ε) by adding the one pilot reception signal and the signal obtained by correcting the other pilot reception signal as shown in the following equation (1), and it may be obtained of the correction value corresponding to the first path difference based on the correction angle ε of the phase difference when the value of the error function E(ε) is minimized.

$$\times \gamma \times e^{j\pi} \times e^{j\frac{2\pi f \Delta d}{c}} \times e^{j\frac{2\pi f \lambda}{c} \frac{\varepsilon}{360}} \quad (1)$$

Herein, the correction angle ε of the phase difference may be scanned in a predetermined angle range centered on the first path difference, and the correction value corresponding to the first path difference may be obtained based on the correction angle ε of the phase difference when the value of the error function E(ε) is minimized under a condition smaller than a predetermined threshold.

The predetermined angle range may be set to an initial setting range covering all angles when the communication relay apparatus is started to operate, and may be set to a range narrower than the initial setting range when the communication relay apparatus is in operation.

In the foregoing communication relay apparatus, the foregoing interference suppression method and the foregoing program, the plural correction values respectively corresponding to the plural first path differences may be obtained and stored based on the plural pilot reception signals, at a predetermined correction timing.

Herein, the correction timing may be a cyclic or non-cyclic periodical timing that is set in advance, or may be a timing when it is detected that the communication quality of the feeder link has deteriorated below a predetermined threshold.

In the foregoing communication relay apparatus, the foregoing system, the foregoing interference suppression method and the foregoing program, the main body of the aerial-staying type communication relay apparatus may be a drone, a HAPS (for example, a solar plane, an airship), a moored balloon, or an artificial satellite.

Advantageous Effects of Invention

According to the present invention, it is possible to prevent degradation of communication quality caused by estimation errors of plural path differences between each of plural gateway stations and plural antennas for feeder link of an aerial-staying type communication relay apparatus.

DESCRIPTION OF EMBODIMENTS

Hereinafter, embodiments of the present invention are described with reference to the drawings.

A communication system according to the embodiments described herein is provided with a drone-radio relay apparatus as an aerial-staying type communication relay apparatus, and plural gateway stations on the ground or on the sea for performing a feeder-link radio communication with the drone-radio relay apparatus. The communication system is a plural-gateway feeder link system (plural-gateway system) with MIMO reception/transmission interference cancellers that can prevent deterioration of communication quality due to estimation errors of plural path differences between the plural gateway stations and plural antennas for feeder link of the drone-radio relay apparatuses.

Figure 1:
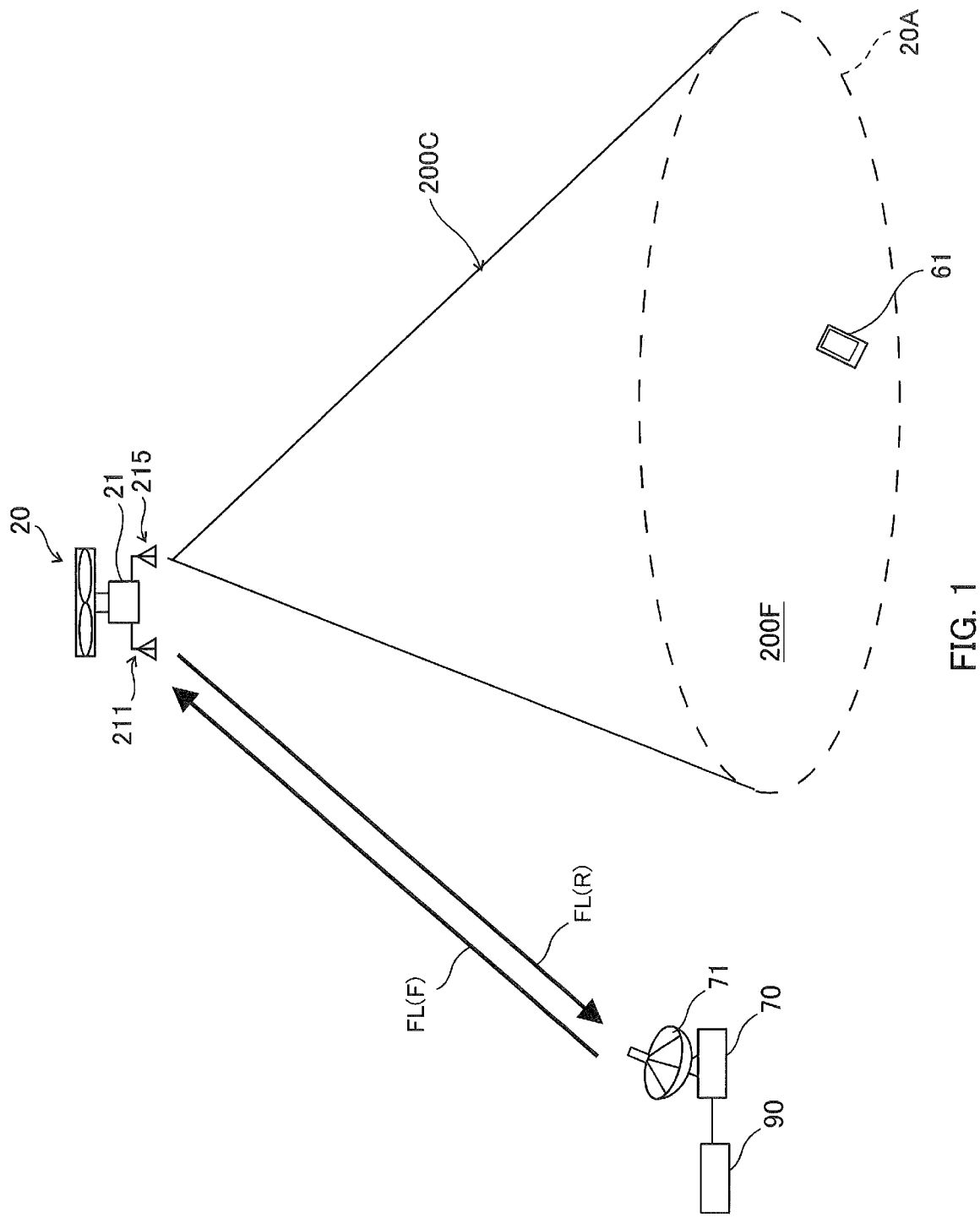
FIG. 1 is an illustration showing an example of an overall schematic configuration of a communication system according to an embodiment of the present invention.

FIG. 1 is an illustration showing an example of a cell configuration of a drone-type radio relay apparatus (hereinafter abbreviated as "drone-radio relay apparatus" or "drone") 20 as a communication relay apparatus in a communication system according to an embodiment of the present invention. The communication system according to the present embodiment is suitable for realizing a three-dimensional network of the fifth-generation or the later generation mobile communication that supports a simultaneous connection to a large number of terminal apparatuses, and low delay, etc. The mobile communication standards disclosed in the present specification are applicable to communication systems, radio relay stations, base stations, repeaters and terminal apparatuses include the fifth-generation mobile communication standard and the fifth-generation and subsequent generation mobile communication standards.

As shown in FIG. 1, the communication system according to the present embodiment is provided with the drone 20 as an aerial-staying type (aerial-floating type) communication relay apparatus. The drone 20 has a configuration in which a repeater-type relay communication station 21 for relaying a radio communication of a terminal apparatus and plural antennas for feeder link (hereinafter referred to as "FL antennas") 211 are incorporated in the drone body. The drone 20 is an unmanned or manned flying object (aircraft) capable of performing a flight control by remote control from the outside or autonomous control. The drone 20 is flight-controlled so as to stay in an upper airspace at a predetermined altitude (for example, 100 to 150 m) from the ground level or the sea level.

In the communication system of the present embodiment, the aerial-staying type (aerial-floating type) communication relay apparatus may be a High-Altitude Platform Stations (HAPS) (also called "high altitude pseudo satellite" or "stratosphere platform"). The HAPS is a solar plane, airship or moored balloon as a floating object that is controlled so as to float or fly and be located in an airspace (floating airspace) with high altitude of 100 [km] or less from the ground level or the sea level by an autonomous control or external control, in which a relay communication station 21 is mounted. The airspace in which the HAPS is located is, for example, a stratospheric airspace with altitude greater than 11 [km] and less than 50 [km] on the ground (or on the water such as the sea or lake). The airspace may be an airspace in an altitude of 15 [km] or more and 25 [km] or less where weather conditions are relatively stable, and may be an airspace with altitude of about 20 [km] in particular. Further, the aerial-staying type (aerial-floating type) communication relay apparatus may be an artificial satellite.

In the following embodiments, it is mainly described of a case in which the aerial-staying type (aerial-floating type) communication relay apparatus is the drone-radio relay apparatus 20.

The cell-formation target airspace, which is a target airspace for forming a three-dimensional cell with one or two or more drones 20 according to the communication system in the present embodiment, is an airspace in a predetermined altitude range (for example, altitude range of 50 [m] or more and 1000 [m] or less) located between the airspace where the drone 20 is located and a cell-formation spatial area near the ground level covered by a base station (for example, LTE eNodeB) such as a conventional macro-cell base station.

It is noted that, the cell-formation target airspace, in which the three-dimensional cell in the present embodiment is formed, may be an airspace over the sea, a river or a lake. Further, the three-dimensional cell formed by the drone 20 may be formed so as to reach the ground level or the sea level so that it can communicate with a terminal apparatus 61 located on the ground or on the water such as the sea.

Each of the relay communication stations 21 of the drone 20 forms plural beams for wirelessly communicating with the terminal apparatus 61 that is a mobile station, toward the ground by an antenna for service link (hereinafter referred to as "SL antenna") 215. The terminal apparatus 61 may be a communication terminal module incorporated in a drone that is an aircraft such as a small helicopter capable of remotely steering, or may be a user apparatus used by a user in an airplane. An area through which the beam passes in the cell-formation target airspace is a three-dimensional cell. The plural beams adjacent to each other in the cell-formation target airspace may be partially overlapped with each other.

Each of the relay communication stations 21 of the drone 20 is, for example, a slave repeater that wirelessly communicates with a GW station (master repeater) 70 as a relay station connected to a core network on the ground (or on the sea) side.

The relay communication station 21 of the drone 20 is connected to a core network of a mobile communication network 80 via the GW station 70 that is disposed on the ground or on the sea and is capable of performing a radio communication by a FL antenna 211. A communication of feeder link between the drone 20 and the GW station 70 may be performed by a radio communication using a radio wave such as a microwave or a millimeter wave, or may be performed by an optical communication using a laser light or the like.

Each of the drone 20 may autonomously control its own floating movement (flight) and a process in the relay communication station 21 by executing a control program with a control section including a computer or the like incorporated inside of the control section. For example, each of the drones 20 may acquire its own current position information (for example, GPS position information), position control information (for example, flight schedule information) stored in advance, position information on another drone-radio relay apparatus located in a peripheral space, and the like, and may autonomously control a floating movement (flight) and process in the relay communication station 21 based on these pieces of information.

The floating movement (flight) of each of the drones 20 and the process in the relay communication station 21 may be controlled by a management apparatus (also referred to as a "remote control apparatus") as a management apparatus that is provided in a communication center or the like of the mobile communication network. The management apparatus can be configured with, for example, a computer apparatus such as a PC, a server, or the like. In this case, the drone 20 may incorporate a communication terminal apparatus for control (for example, mobile communication module) so that it can receive the control information from the management apparatus and transmit various pieces of information such as monitoring information to the management apparatus, and may be assigned terminal identification information (for example, IP address, phone number, etc.) so that it can be identified from the management apparatus. The MAC address of the communication interface may be used to identify the communication terminal apparatus for control.

Each of the drones 20 may transmit information on the floating movement (flight) of the own or surrounding drone-radio relay apparatuses and/or the process at the relay communication station 21, and monitoring information such as information on a status of the drone 20 and observation data acquired by various kinds of sensors, to a predetermined destination such as the management apparatus. The control information may include information on a target flight route of the drone 20. The monitoring information may include at least one of information on a current position, flight-route history information, velocity relative to the air, velocity relative to the ground and propulsion direction of the drone 20, wind velocity and wind direction around the drone 20, and atmospheric pressure and temperature around the drone 20.

Duplex methods of uplink and downlink for radio communication with the relay communication station 21 and the terminal apparatus 61 are not limited to the specific method, and may be, for example, a time division duplex method (Time Division Duplex: TDD) or a frequency division duplex method (Frequency Division Duplex: FDD). An access method for radio communication with the relay communication station 21 and the terminal apparatus 61 is not limited to the specific method, but may be, for example, FDMA (Frequency Division Multiple Access) method, TDMA (Time Division Multiple Access) method, CDMA (Code Division Multiple Access) method, or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using plural antennas for both of transmission and reception. The MIMO technology may be an SU-MIMO (Single-User MIMO) technology in which one base station transmits plural signals to one terminal apparatus on the same time/same frequency, and may be an MU-MIMO (Multi-User MIMO) technology in which one base station transmits signals to plural different communication terminal apparatuses on the same time/same frequency or plural different base stations transmit signals to one terminal apparatus on the same time/same frequency.

In the following description, a link between the drone 20 and a base station 90 via the GW station 70 is referred to as "feeder link", and a link between the drone 20 and the terminal apparatus 61 is referred to as a "service link". In particular, a section between the drone 20 and the GW station 70 is referred to as a "radio section of feeder link". Further, a downlink of a communication from the GW station 70 to the terminal apparatus 61 via the drone 20 is referred to as a "forward link", and an uplink of a communication from the terminal apparatus 61 to the GW station 70 via the drone 20 is also referred to as a "reverse link".

In FIG. 1, the drone 20 is, for example, positioned at an altitude and forms a single cell 20A or plural cells. In case that the aerial-staying type (aerial-floating type) communication relay apparatus is HAPS, the HAPS is located in the stratosphere about several tens of km, and the HAPS forms single or plural cells, and the diameter of the service area consisting of the footprint of the cell is, for example, 100 to 200 km.

In FIG. 1, a communication service that directly communicates with the terminal apparatus 61 on the ground (or on the water) using the drone 20 is very attractive as an expansion of service area and a communication means in the event of a disaster. The communication line of the drone 20 comprises a feeder link FL connecting the GW station 70 and the drone 20, and a service link SL connecting the drone 20 and the terminal apparatus 61. Since the communication capacity of the service link depends on the communication capacity of the feeder link that is the relay frequency, it is necessary to improve the frequency utilization efficiency of the feeder link. In particular, in case that the service link has a multi-cell configuration as shown in FIG. 1, the communication capacity of the feeder link tends to be insufficient, so that a frequency effective utilization technology for the feeder link is indispensable. However, in case that the drone 20 and the GW station 70 are configured one-to-one, it is difficult to improve the frequency utilization efficiency of the feeder link.

Therefore, in the present embodiment, a "plural-gateway feeder link system" or "plural-gateway system" (hereinafter also referred to as "plural-GW system") is constructed, which is configured with plural GW stations 70 that transmit and receive relay signals different from each other on a same frequency to and from the drone 20 in the feeder links of Frequency Division Duplex (FDD) method, and performs a spatial-division multiplex communication in multi feeder links formed between one drone 20 and plural GW stations 70. In the plural-GW system, by eliminating interference between the plural feeder links, the frequency utilization efficiency can be improved depending on the number of GW stations 70 that are disposed.

It is noted that, in the following embodiments, although it is described regarding some cases in which the spatial-division multiplex communication between the drone 20 and the plural GW stations 70 is performed only by a forward link of the feeder link, the spatial-division multiplex communication may be performed only by a reverse link of the feeder link, or may be performed by both of the forward link and the reverse link.

Figure 2B:
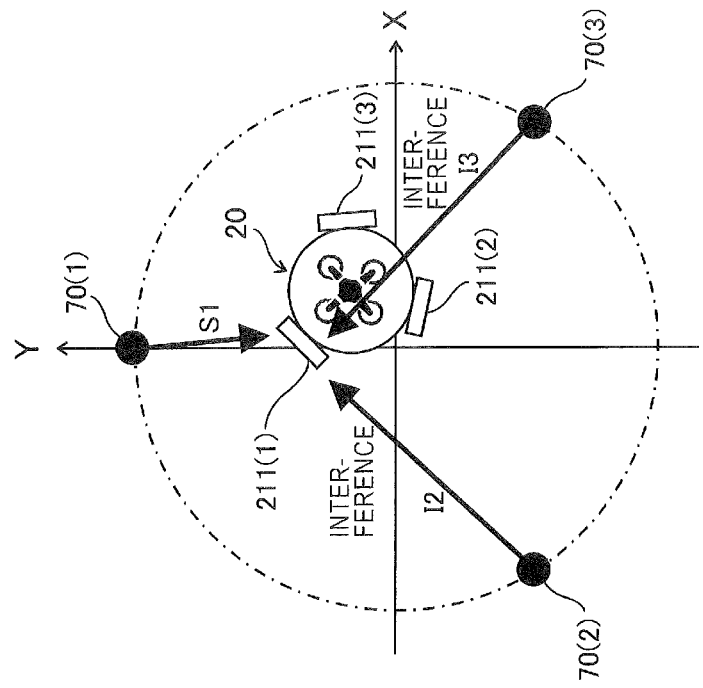
FIG. 2B is a top view illustration of a relationship between plural antennas for feeder link (FL antenna) of a drone-radio communication apparatus and plural GW stations.
Figure 2A:
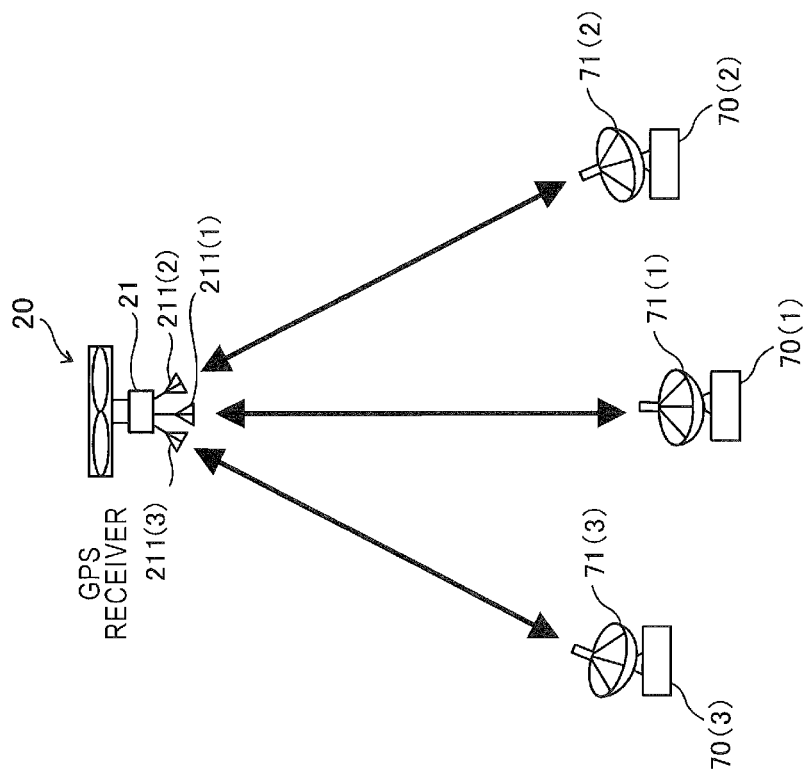
FIG. 2A is a side view showing an example of a schematic configuration of a plural-GW system according to an embodiment.

FIG. 2A is a side view showing an example of a schematic configuration of the plural-GW system according to the embodiment, and FIG. 2B is a top view illustration of a relationship between the plural FL antennas 211(1) to 211(3) of the drone 20 and the plural GW stations 70(1) to 70(3). In the illustrated example, the number (N) of the FL antennas (N) and the number (N) of the GW stations (N) is the same number (3 in the illustrated example), and the same number of the FL antennas 211(1) to 211(3) and the GW stations 70(1) to 70(3) are provided in a one-to-one correspondence with each other.

The number of sets of the FL antenna 211 and the GW station 70 may be two sets, or may be four or more sets. In the illustrated example, although the plural GW stations 70 are disposed so that distances from the drone 20 and intervals between the GW stations are equal to each other, at least one of the distances and the intervals may be different from each other. Each of the GW station 70(1) to 70(3) is disposed so that complex amplitudes received by the respective FL antennas 211 of the drone 20 are uncorrelated. Further, each of the antennas for feeder link (hereinafter referred to as "GW antenna") 71(1) to 71(3) of GW stations 70(1) to 70(3) can transmit and receive radio signals with two kinds of polarized waves of a vertically polarized wave (V) and a horizontally polarized wave (H) which are orthogonal to each other.

In the illustrated example, although the plural FL antennas 211(1) to 211(3) of the drone 20 are disposed so that distances from the center of the drone 20 and intervals between the FL antennas are equal to each other, at least one of the distances and the intervals may be different from each other between the FL antennas. For example, the distances and the intervals may be different from each other between the FL antennas.

Each of the plural FL antennas 211(1) to 211(3) of the drone 20 may have an antenna directional beam (hereinafter referred to as "directional beam" or "beam") corresponding to each of the GW stations 70(1) to 70(3), and the drone 20 may be provided with an antenna control section that controls the FL antennas 211(1) to 211(3) so that the directional beams of the plural FL antennas 211(1) to 211(3) are respectively directed toward the corresponding GW stations 70(1) to 70(3). As a control system of the directional beams of the plural FL antennas 211(1) to 211(3) by the antenna control section, it is capable of using various systems such as a gimbal system, an electric system (360-degrees beamforming control system), and an electric system (angle-limited beamforming control system+antenna switching).

In the plural-GW system with the above-described configuration, an interference in at least one of the forward link and reverse link between GW stations (between feeder links) may increase. For example, as shown in FIG. 2B, while a desired signal (intended signal) S1 transmitted from the GW station 70(1) is receiving by the FL antenna 211(1) of the drone 20, signals transmitted from other GW stations 70(2) and 70(3) are received by the FL antenna 211(1) as interference signals I2 and I3. Therefore, SINR characteristics of the feeder link may deteriorate.

Figure 3:
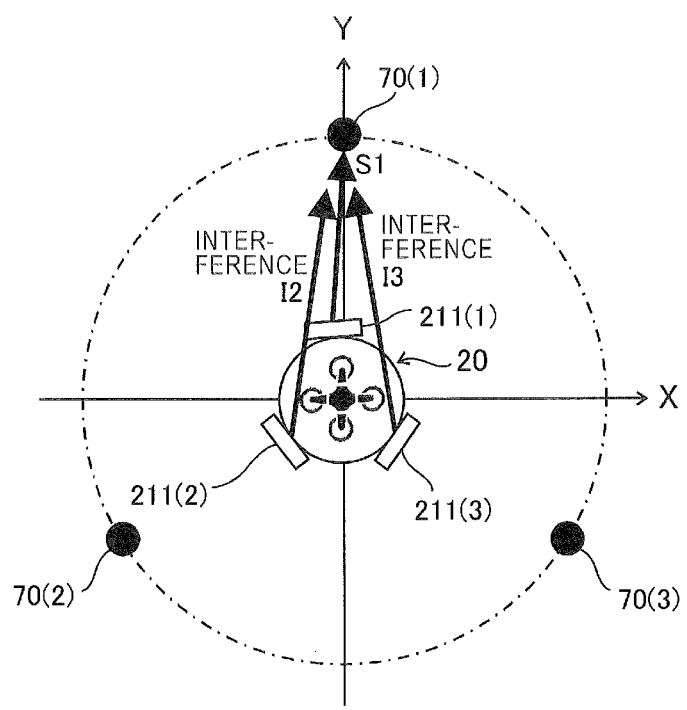
FIG. 3 is an illustration of an example of a reverse link interference between GW stations (between feeder links) in a plural-GW system.

Furthermore, as shown in FIG. 3, while the desired signal (intended signal) S1 transmitted from the FL antenna 211(1) of the drone 20 is receiving by the GW station 70(1), signals transmitted from the other FL antennas 211(2) and 211(3) of the drone 20 are received by the GW station 70(1) as interference signals I2 and I3. Therefore, SINR characteristics of the feeder link (reverse link) may deteriorate.

Therefore, in the present embodiment, as shown below, by applying a MIMO interference canceller supporting the line-of-sight environment (LOS: Line-Of-Sight) between the GW stations (between the feeder links) to reduce the interference of the forward link and the reverse link between the GW stations (between the feeder links), the SINR characteristics of the feeder links (forward, reverse link) are improved.

In the following description, it is explained of a configuration and a method of MIMO reception/transmission interference canceller for reducing the interference of the forward link and reverse link between GW stations (between feeder links) in the plural-GW system of the present embodiment.

Figure 4:
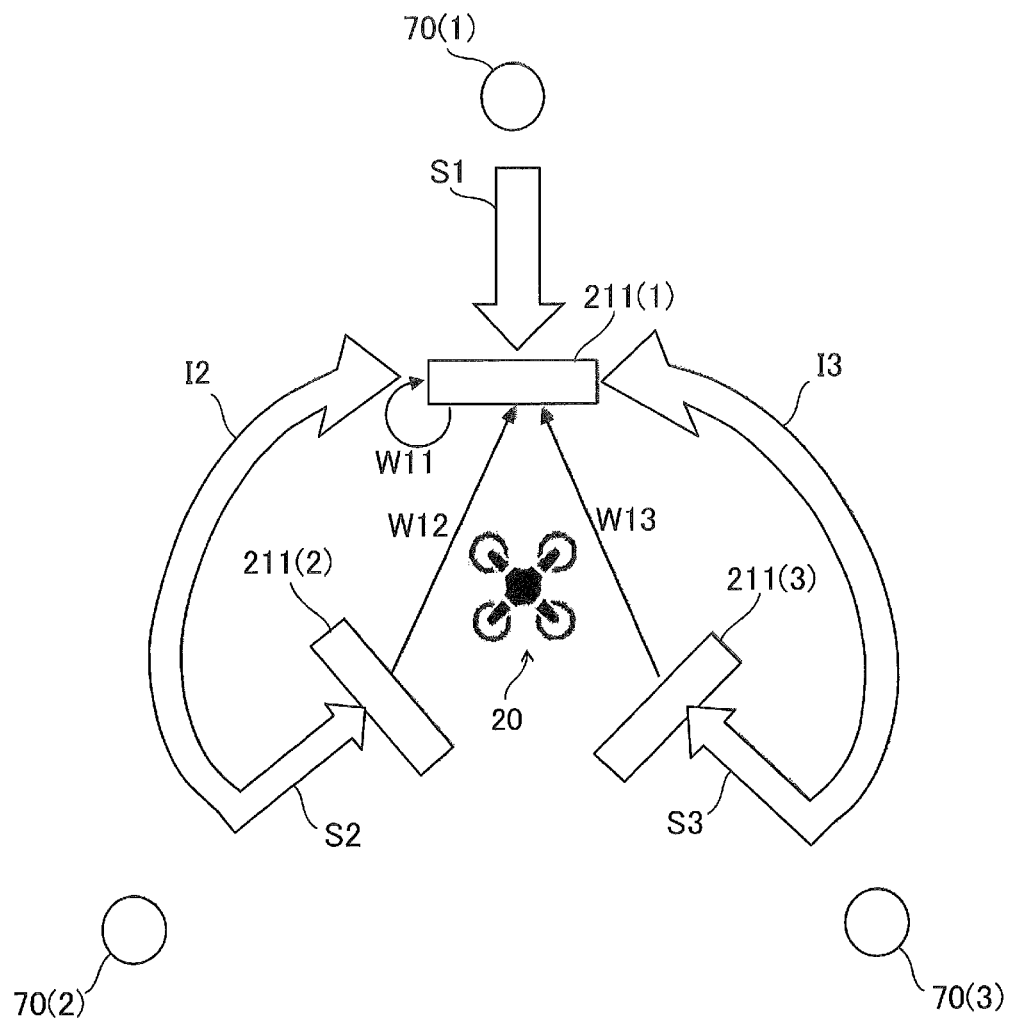
FIG. 4 is an illustration showing an example of a MIMO interference canceller to which a weight W is obtained by an approximate expression and applied.
Figure 5:
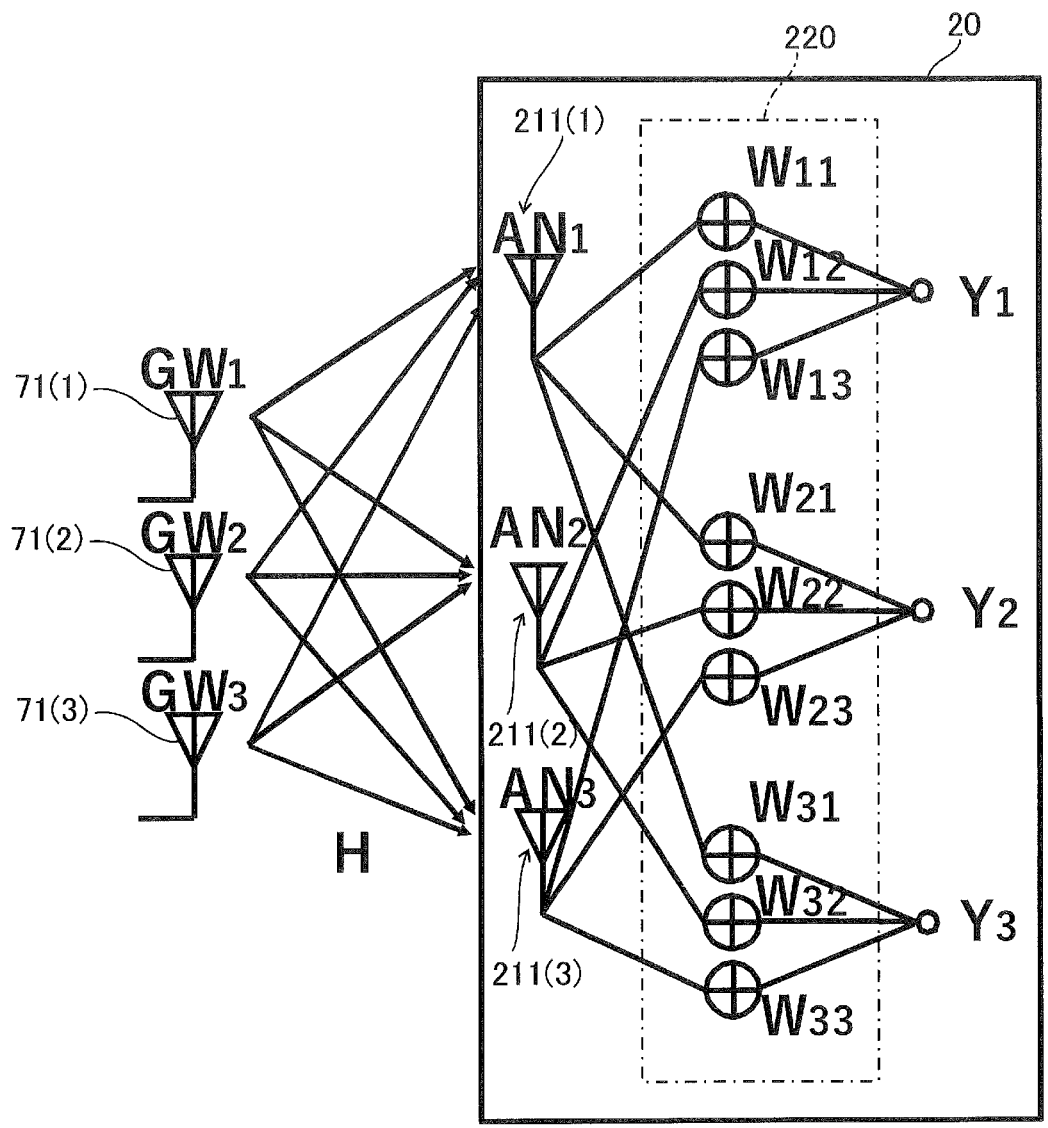
FIG. 5 is an illustration showing an example of a schematic configuration of an interference canceller section of a forward link provided on a drone side (reception-side) in a multi-feeder link of a plural-GW system according to an embodiment.

FIG. 4 is an illustration showing an example of a MIMO interference canceller to which a weight W is obtained by an approximate expression and applied. FIG. 5 is an illustration showing an example of a schematic configuration of an interference canceller section 220 of a forward link provided on the drone-radio relay apparatus side in a multi-feeder link of a plural-GW system according to the embodiment. A reception signal E received by the FL antennas 211(1) to 211(3) of the drone 20 is expressed by the following equation (2). In equation (2), H is the channel response of the feeder link, S is the desired signal (transmission signal) transmitted from the GW stations 70(1) to 70(3), and N is noise including interference.

$$E = HS + N \qquad (2)$$

For example, the FL antenna 211(1) of the drone 20 receives a desired signal S1(Y11) transmitted from the GW station 70(1), an interference signal I2(Y12) transmitted from the GW station 70(2), and an interference signal I3(Y13) transmitted from the GW station 70(3). The reception signal AN1 is expressed by the following equation (3).

$$AN1 = S1 + I2 + I3 \quad (3)$$

The interference canceller section 220 of the drone 20 extracts a pilot signal $H_P$ that is transmitted outside the transmission signal band from the GW stations 70(1) to 70(3), from the reception signal E received by the FL antennas 211(1) to 211(3). Furthermore, the interference canceller section 220 estimates a propagation path response $H_F(f)$ of an arbitrary frequency f within the transmission signal band, based on the pilot signal $H_P$ extracted from the reception signal E. Also, the interference canceller section 220 calculates a reception weight W, a transmission weight W, or both based on the estimation result of the propagation path response $H_F(f)$.

As shown in the following equation (4), by applying the reception weight W to the reception signal E received from the GW stations 70(1) to 70(3), a reception signal S' (≈desired signal S), in which the interference between plural feeder links is reduced, can be output to the service link side.

$$S' = WE = H^{-1}(HS+N) \approx S \quad (4)$$

As shown in the following equation (5), the transmission weight W is applied to a transmission signal that is input from the service link side and is to be transmitted to the GW stations 70(1) to 70(3), and the transmission signal, to which the transmission weight W is applied, is transmitted to the GW stations 70(1) to 70(3). As a result, a signal S' (≈desired signal S), in which the interference between plural feeder links is reduced, can be received in the GW stations 70(1) to 70(3).

$$S' = W(H^{-1}S+N) = H(H^{-1}S+N) \approx S \quad (5)$$

For example, as shown in the following equation (6), by multiplying the signals S2 and S3 received by the other FL antennas 211(2) and 211(3) by the weights W2 and W3 respectively corresponding to the signals, and subtracting them, the desired signal S1(Y11), in which the interference signals I2 and I3 are canceled, can be output. Similarly, for desired signals S2(Y22) and S3(Y33) transmitted from the GW stations 70(2) and 70(3), interference signals from the other GW stations can be canceled.

$$S1 = w11 \cdot AN1 + w12 \cdot AN2 + w13 \cdot AN3 \quad (6)$$

Figure 6:
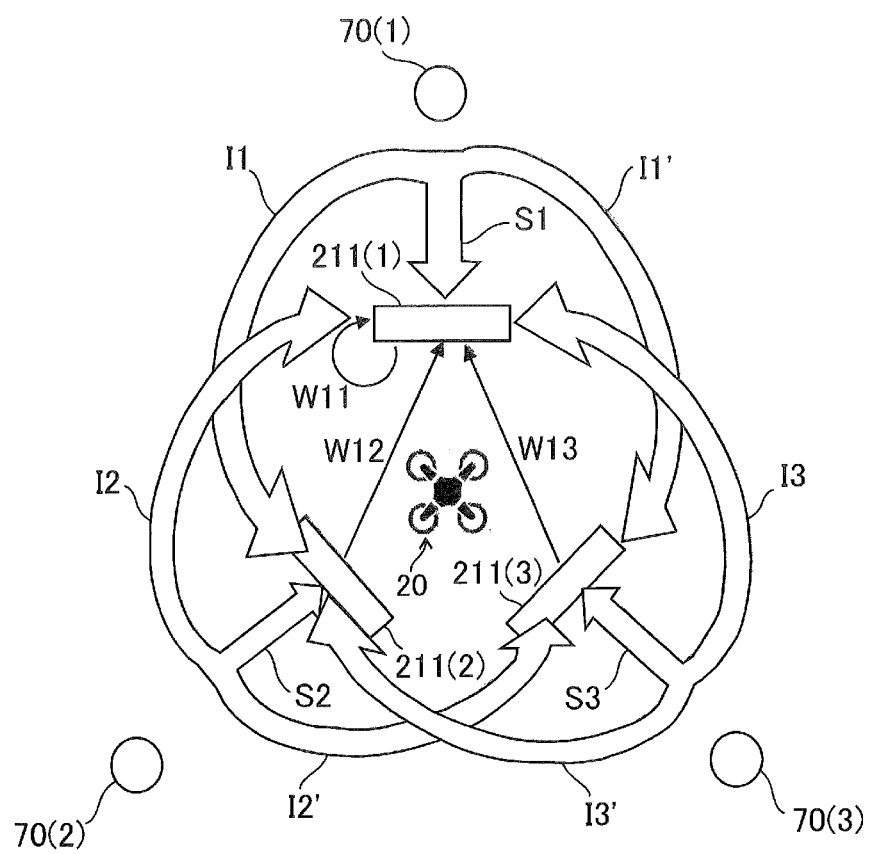
FIG. 6 is an illustration showing an example of a MIMO interference canceller to which a weight W obtained by the ZF method is applied.

FIG. 6 is an illustration showing an example of the MIMO interference canceller to which the weight W obtained by the ZF (Zero-Forcing) method is applied. For example, the signal transmitted from the GW station 70(1) is not only received by the FL antenna 211(1) of the drone 20 as the desired signal S1(Y11), but also received by the FL antennas 211(2) and 211(3) as the interference signals I1(Y12) and I1'(Y13). The signal transmitted from the GW station 70(2) is not only received by the FL antenna 211(1) as the interference signal I2(Y21), but also received by the FL antenna 211(3) as an interference signal I2'(Y23). Further, the signal transmitted from the GW station 70(3) is not only received by the FL antenna 211(1) as the interference signal I3(Y31), but also received by the FL antenna 211(2) as an interference signal I3'(Y32). In the MIMO interference canceller of FIG. 6, considering these interference signals I1, I1', I2' and I3', the desired signal S1(Y11) is output as shown in the following equation (7), for example.

$$S1 = w11(Y11+Y12+Y13) + w12(Y21+Y22+Y23) + w13(Y31+Y32+Y33) \quad (7)$$

In order to calculate the weight W used for the MIMO interference canceller, it is necessary to grasp the propagation path response H (see FIG. 7) between the FL antennas 211(1) to 211(3) of the drone 20. In particular, in the plural-GW system of the present embodiment, since an airship of the drone 20 moves relative to the GW stations 70(1) to 70(3), the propagation path response H also changes according to the movement.

Figure 7:
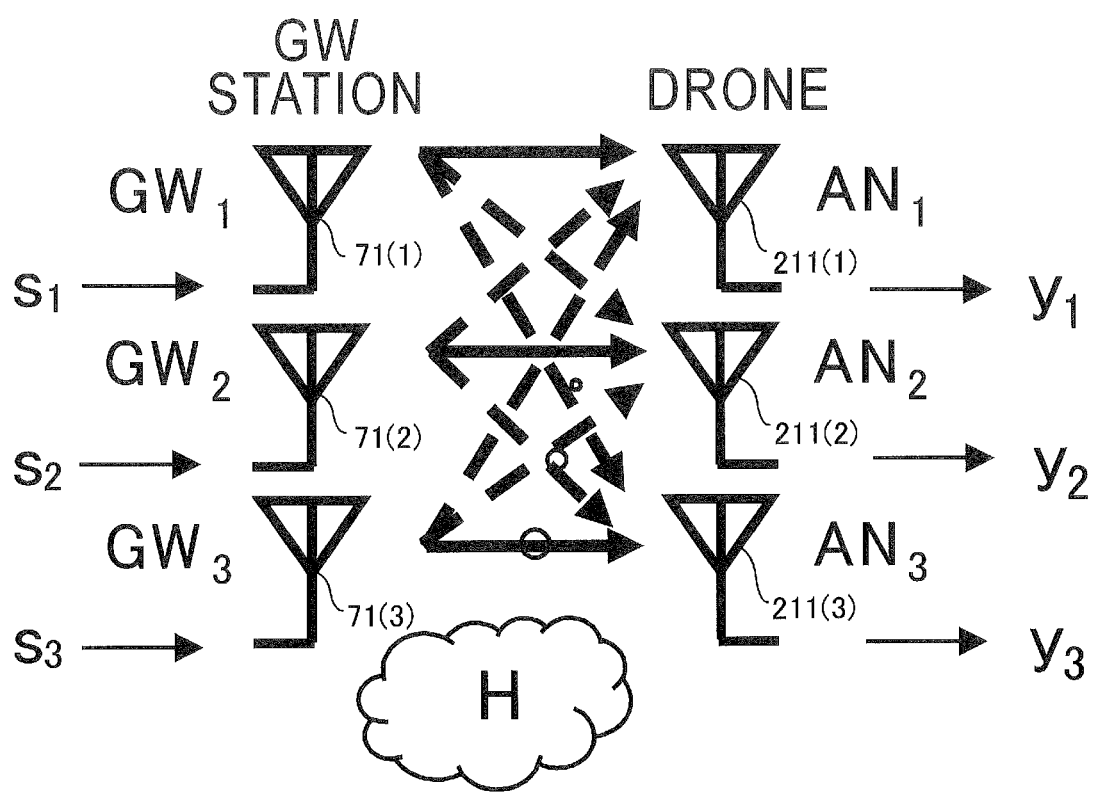
FIG. 7 is an illustration showing an example of a propagation path response H of feeder link in a plural-GW system according to an embodiment.

The following equation (8) shows an example of the propagation path response H of the propagation path between the antennas of the GW stations 70(1) to 70(3) and the FL antennas 211(1) to 211(3) of the drone 20 in the plural-GW system shown in FIG. 7. The antennas of the GW stations 70(1) to 70(3) respectively transmits desired signals (intended signals) $s_1$, $s_2$, and $s_3$, and the FL antennas 211(1) to 211(3) of the drone 20 receive radio waves from the GW stations 70(1) to 70(3) and output reception signals $y_1$, $y_2$ and $y_3$.

$$H = \begin{bmatrix} h_{11} & h_{12} & h_{13} \\ h_{21} & h_{22} & h_{23} \\ h_{31} & h_{32} & h_{33} \end{bmatrix} \quad (8)$$

The following equation (9) shows matrix elements in the propagation path response H. The $|h_{ij}|$ in the equation (9) corresponds to the reception signal level of the signal transmitted from the antenna of the i-th GW station 70(i) and received by the j-th FL antenna 211(j) of the drone 20. Further, the $d_{ij}$ in the equation (9) is the path length (see FIG. 9) between the antenna of GW station 70(i) and the j-th FL antenna 211(j) of the drone 20. Each of the "f" and the "c" in the equation (9) is the frequency and the velocity (=light velocity) of the transmitted and received signals.

$$h_{ij} = |h_{ij}| e^{j2\pi f d_{ij}/c} \quad (9)$$

Figure 8:
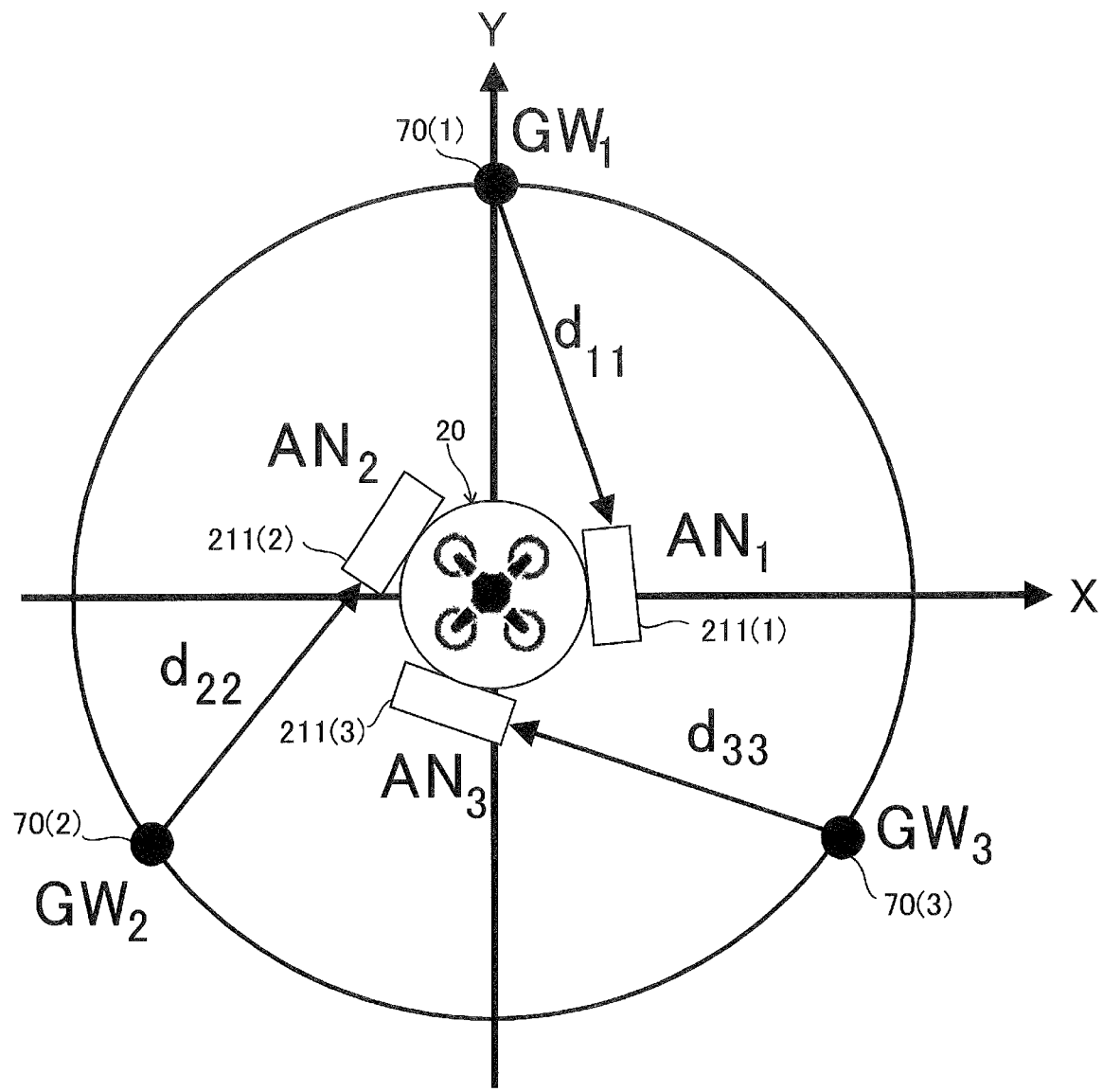
FIG. 8 is an illustration showing an example of reference path lengths in a plural-GW system according to an embodiment.
Figure 9:
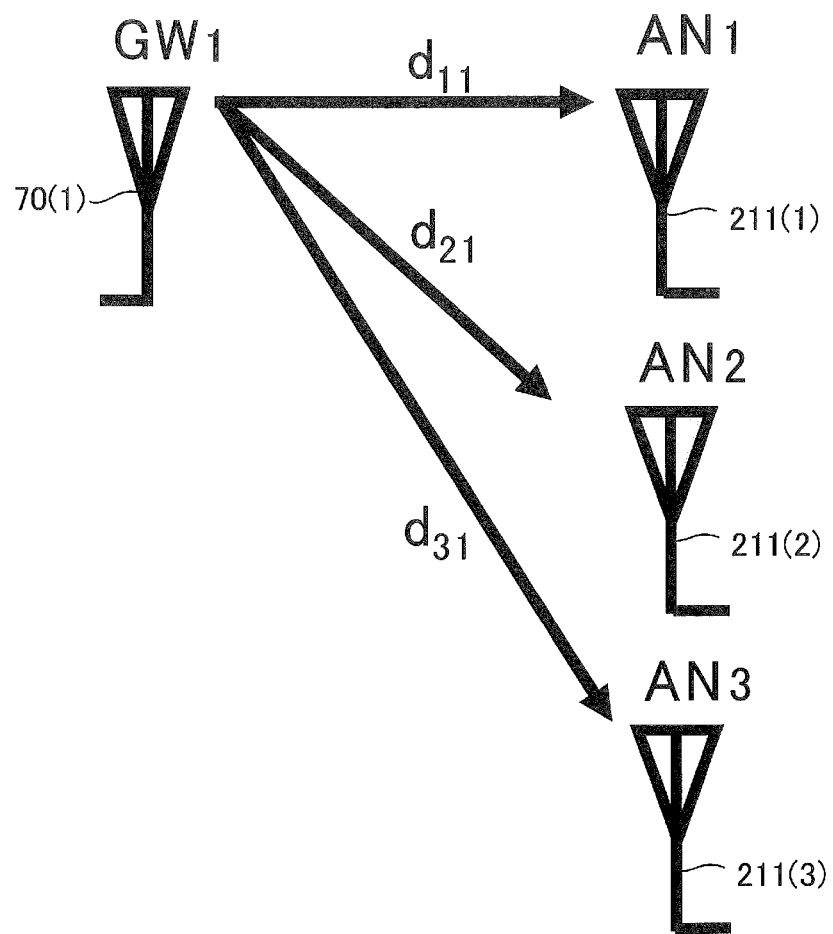
FIG. 9 is an illustration showing an example of the path lengths between the antenna of the GW station and the FL antennas of the drone-radio relay apparatus in FIG. 8.

As shown in FIG. 8 and FIG. 9 described above, in order to estimate the propagation path response H, it is necessary to grasp the path length $d_{ij}$ between the GW station 70(i) and the FL antenna 211(j) of the drone 20. It is difficult to grasp each path length $d_{ij}$. Therefore, in the present embodiment, rather than grasping each path length $d_{ij}$, by referring to a main path between the antennas transmitting and receiving the desired signal in the feeder link of the plural-GW system, defining the path length as the reference path length ds, expressing the other path lengths between antennas with the reference path length ds and the path difference Δd, and obtaining the path difference Δd, a relative propagation path response (hereinafter also referred to as "relative-propagation path response") composed of the path difference components is estimated, which corresponds to the propagation path response (hereinafter also referred to as "reference-propagation path response") composed of reference path components serving as a reference.

For example, in the feeder link of the plural-GW system in FIG. 8, the GW station 70(1) transmits the desired signal to the FL antenna 211(1) of the drone 20, the GW station 70(2) transmits the desired signal to the FL antenna 211(2) of the drone 20, and the GW station 70(3) transmits the desired signal to the FL antenna 211(3) of the drone 20. Therefore, each of the three path lengths $d_{ii}$ (i=1, 2, 3) between the antenna of GW station 70(i) and FL antenna

211(i) is the reference path length, and each of the other path lengths $d_{ij}$ (i≠j) between the antenna of the GW station 70(i) and the FL antenna 211(j) can be expressed by the sum of the reference path length $d_{ii}$ (i=1, 2, 3) and the path difference $\Delta d_{ij}$ (i≠j).

Figure 10:
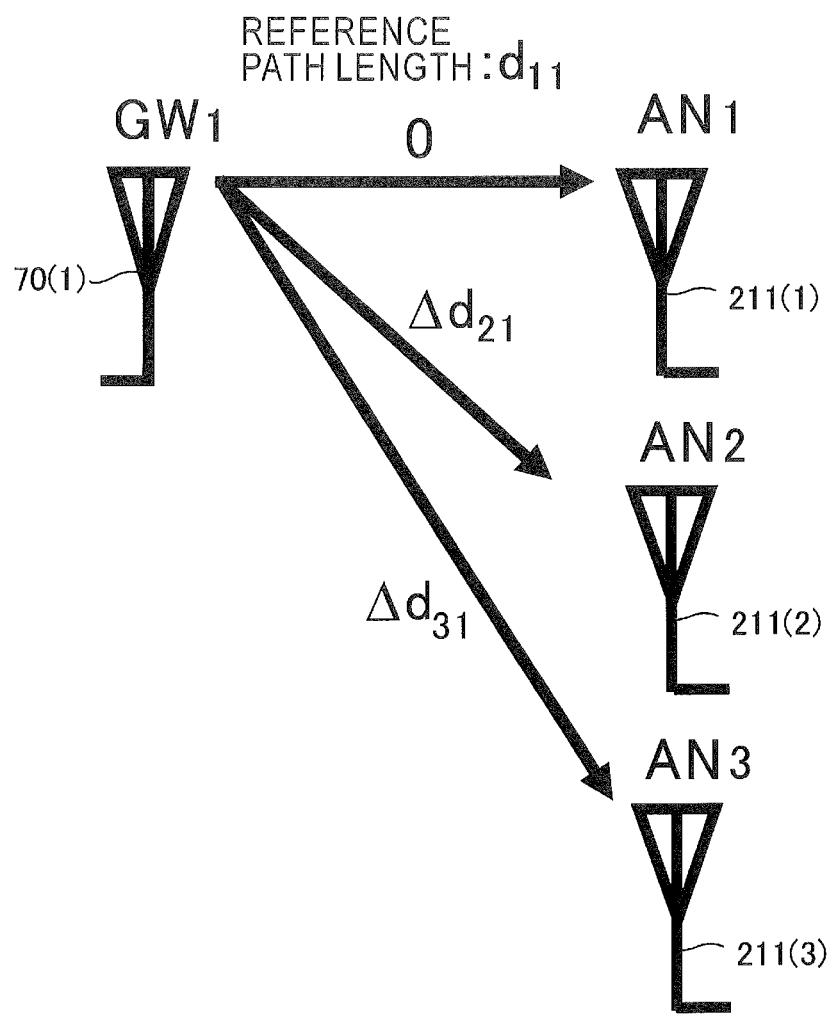
FIG. 10 is an illustration showing an example of path differences based on the reference path length between the antenna of the GW station and the FL antennas of the drone-radio relay apparatus in FIG. 8.

For example, in the case of a propagation path in which the signal transmitted from the first GW station 70(1) is received by each of the FL antennas 211(1) to 211(3) of the drone 20, it is difficult to directly grasp the path lengths $d_{11}$, $d_{21}$, and $d_{31}$ (see FIG. 9) between the antenna of the GW station 70(1) and each of the FL antenna 211(1) to 211(3) of the drone 20. Assuming that the path length $d_{11}$ between the antenna of the GW station 70(1) and the FL antenna 211(1), in which the desired signal is transmitted and received, is the reference path length, the path lengths $d_{21}$ and $d_{31}$ of the other paths can be expressed by the sum of the reference path length $d_{11}$ and the path differences $\Delta d_{21}$ and $\Delta d_{31}$ (see FIG. 10) as shown in the following equation (10).

$$d_{21}=d_{11}+\Delta d_{21}$$

$$d_{31}=d_{11}+\Delta d_{31} \quad (10)$$

The path difference $\Delta d_{ij}$ (i≠j) can be grasped from a pilot signal that is a known signal, as described below. As shown in the following equation (11), the propagation path response H can be expressed by a relative-propagation path response consisting of path difference components $h_{ij}$ ($\Delta d_{ij}$) (i≠j, i=1, 2, 3, j=1, 2, 3) and a reference-propagation path response consisting of reference path components (main path components) $h_{ii}$ ($d_{ii}$) (i=1, 2, 3).

$$H(f) = \begin{bmatrix} h_{11}(d_{11}) & h_{12}(d_{12}) & h_{13}(d_{13}) \\ h_{21}(d_{21}) & h_{22}(d_{22}) & h_{23}(d_{23}) \\ h_{31}(d_{31}) & h_{32}(d_{32}) & h_{33}(d_{33}) \end{bmatrix} \quad (11)$$

$$= \begin{bmatrix} 1 & h_{12}(\Delta d_{12}) & h_{13}(\Delta d_{13}) \\ h_{21}(\Delta d_{21}) & 1 & h_{23}(\Delta d_{23}) \\ h_{31}(\Delta d_{31}) & h_{32}(\Delta d_{32}) & 1 \end{bmatrix}$$

$$\begin{bmatrix} h_{11}(d_{11}) & 0 & 0 \\ 0 & h_{22}(d_{22}) & 0 \\ 0 & 0 & h_{33}(d_{33}) \end{bmatrix}$$

The path difference component $\Delta h_{ij}$ (=$h_{ij}$ ($\Delta d_{ij}$)) in the equation (11) is expressed by the following equation (12). In the present embodiment, by obtaining the path difference $\Delta d_{ij}$ in the equation (12), the relative-propagation path response (path difference component $\Delta h_{ij}=h_{ij}$ ($\Delta d_{ij}$)) corresponding to the reference-propagation path response (main path component) is estimated.

$$\Delta h_{ij}=e^{j2\pi f \Delta d_{ij}/c} \quad (12)$$

In the present embodiment, in order to dynamically grasp the propagation path response H, a narrowband pilot signal is transmitted from each of the GW stations 70(1) to 70(3) in adjacent frequency bands (guard bands) outside the transmission signal band.

Figure 11:
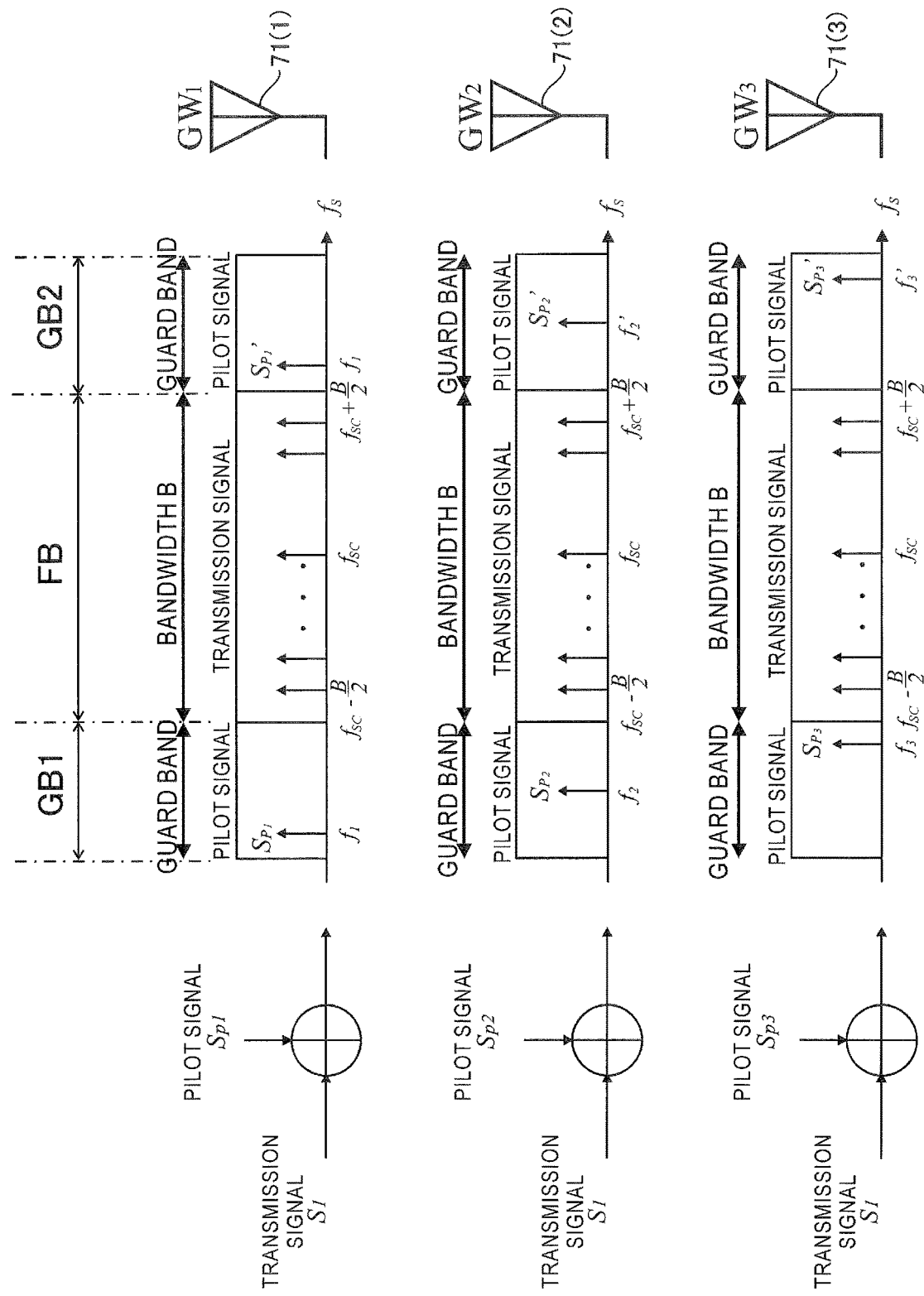
FIG. 11 is an illustration showing an example of a pilot signal in an uplink-transmission signal band transmitted from each GW station.
Figure 12:
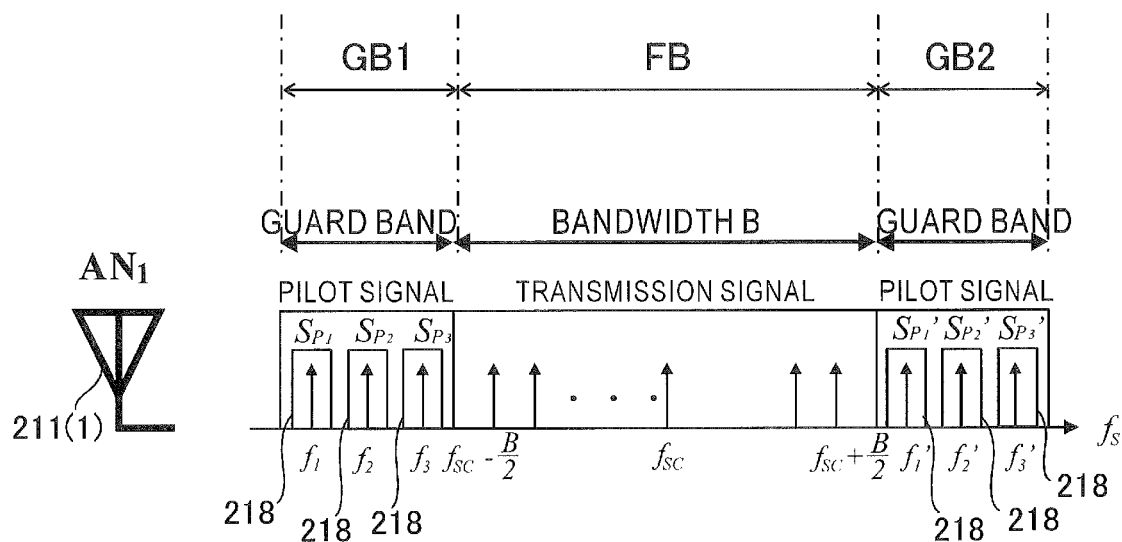
FIG. 12 is an illustration showing an example of a pilot signal in an uplink-reception signal band received by a drone-radio relay apparatus according to an embodiment.
Figure 13:
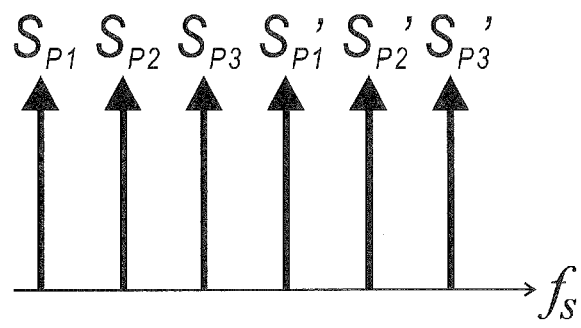
FIG. 13 is an illustration showing an example of a pilot signal used for deriving a propagation path response.
Figure 14:
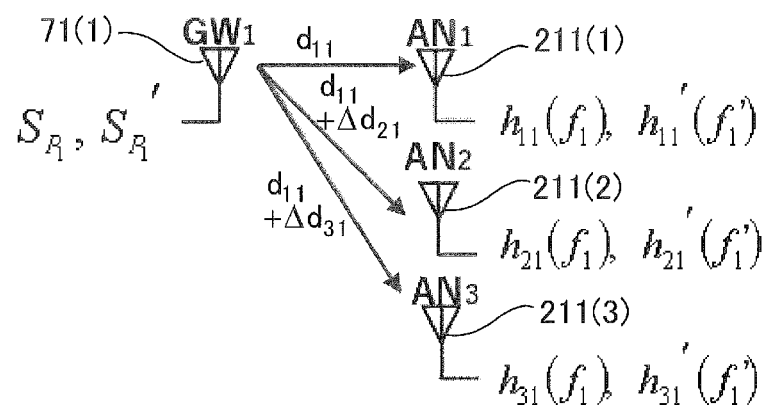
FIG. 14 is an illustration showing an example of a derivation model of propagation path response of a feeder link.

FIG. 11 is an illustration showing an example of pilot signals in an uplink-transmission signal band transmitted from the GW stations 70(1) to 70(3). FIG. 12 is an illustration showing an example of pilot signals in an uplink-reception signal band received by the drone 20. FIG. 13 is an illustration showing an example of pilot signals separated by a filter and used for deriving the propagation path response. FIG. 14 is an illustration showing an example of a derivation model of propagation path responses of feeder links using the pilot signals in FIG. 11 to FIG. 13.

In the illustrated example, plural narrowband pilot signals, which are known signals transmitted from each of the GW stations 70(1) to 70(3), are distributed and disposed in each of a first guard band GB1 that is a first adjacent band and a second guard band GB2 that is a second adjacent band, which are respectively adjacent from a low-frequency side and a high-frequency side to the transmission signal band FB of the feeder link in which the desired signals $S_1$, $S_2$, $S_3$ are respectively transmitted from the GW stations 70(1) to 70(3). Specifically, pilot signals $S_{P1}$, $S_{P2}$, and $S_{P3}$ with frequencies $f_1$, $f_2$, and $f_3$ different from each other, which are transmitted respectively from the GW stations 70(1) to 70(3), are located in the first guard band GB1. Pilot signals $S_{P1}'$, $S_{P2}'$, $S_{P3}'$ with frequencies $f_1'$, $f_2'$, $f_3'$ different from each other, which are transmitted respectively from the GW stations 70(1) to 70(3), are located in the second guard band GB2.

The relay communication station 21 of the drone 20 separates the plural pilot signals $S_{P1}$, $S_{P2}$, $S_{P3}$ of the first guard band GB1 received from the GW stations 70(1), 70(2) and 70(3) by a filter, respectively, and separates the plural pilot signals $S_{P1}'$, $S_{P2}'$, $S_{P3}'$ of the second guard band GB2 received from the GW stations 70(1), 70(2) and 70(3) by a filter, respectively.

Next, the relay communication station 21 of the drone 20 separates the pilot reception signal $S_{Pi}$ (i=1 to 3) of frequency $f_i$ and the pilot reception signal $S_{Pi}'$ (i=1 to 3) of frequency $f_i'$ from the reception signal using a narrowband reception filter 218 as shown in FIG. 12 (see FIG. 13).

Since the plural pilot signals $S_{P1}$, $S_{P2}$, $S_{P3}$ and the pilot signals $S_{P1}'$, $S_{P2}'$, $S_{P3}'$ with the frequencies $f_1$, $f_2$, $f_3$, $f_1'$, $f_2'$, $f_3'$ different from each other, which are transmitted respectively from the GW stations 70(1) to 70(3), are evenly distributed and disposed in the first guard band GB1 and the second guard band GB2, each pilot signal can be separated by the narrow band filter and easily detected individually.

The relay communication station 21 obtains, with respect to each of the frequencies $f_i$ and $f_i'$, the propagation path responses $h_{ki}$ and $h_{ki}'$ from the k-th GW station 70(k) to the i-th FL antenna 211(i) of the drone 20, from the pilot reception signals $S_{Pi}$ and $S_{Pi}'$ by using the following equations (13) and (14) as shown in the following equations (15) and (16).

$$P_{ki}=h_{ki}S_{pi} \quad (13)$$

$$h_{ki} = \frac{P_{ki}}{S_{pi}} \quad (14)$$

$$H_P = \begin{bmatrix} h_{11}(f_1) & h_{12}(f_2) & h_{13}(f_3) \\ h_{21}(f_1) & h_{22}(f_2) & h_{23}(f_3) \\ h_{31}(f_1) & h_{32}(f_2) & h_{33}(f_3) \end{bmatrix} \quad (15)$$

$$H_P' = \begin{bmatrix} h_{11}'(f_1') & h_{12}'(f_2') & h_{13}'(f_3') \\ h_{21}'(f_1') & h_{22}'(f_2') & h_{23}'(f_3') \\ h_{31}'(f_1') & h_{32}'(f_2') & h_{33}'(f_3') \end{bmatrix} \quad (16)$$

The relay communication station 21 outputs the obtained information on the propagation path response $h_{ki}$ (see equations (13) to (16)) to the interference canceller section 220.

Herein, for example, each of the pilot signals $h_{11}$, $h_{11}'$, $h_{21}$ and $h_{21}'$ received by the FL antennas 211(1) and 211(2) of the drone 20 is expressed by the following equations (17), (18), (19) and (20), and each of the ratios $h_{21}/h_{11}$ and $h_{21}'/h_{11}'$ of those signals is expressed by the following equations (21) and (22).

$$h_{11} = |h_{11}|e^{j\theta_{11}} = |h_{11}|e^{j2\pi f_1 \frac{d_{11}}{c}} \quad (17)$$

$$h'_{11} = |h_{11}|e^{j\theta'_{11}} = |h_{11}|e^{j2\pi f'_1 \frac{d_{11}}{c}} \quad (18)$$

$$h_{21} = |h_{21}|e^{j\theta_{21}} = |h_{21}|e^{j2\pi f_1 \frac{d_{11}+\Delta d_{21}}{c}} \quad (19)$$

$$h'_{21} = |h_{21}|e^{j\theta'_{21}} = |h_{21}|e^{j2\pi f'_1 \frac{d_{11}+\Delta d_{21}}{c}} \quad (20)$$

$$\frac{h_{21}}{h_{11}} = \frac{|h_{21}|}{|h_{11}|}e^{j(\theta_{21}-\theta_{11})} = \frac{|h_{21}|}{|h_{11}|}e^{j2\pi f_1 \frac{\Delta d_{21}}{c}} \quad (21)$$

$$\frac{h'_{21}}{h'_{11}} = \frac{|h_{21}|}{|h_{11}|}e^{j(\theta'_{21}-\theta'_{11})} = \frac{|h_{21}|}{|h_{11}|}e^{j2\pi f'_1 \frac{\Delta d_{21}}{c}} \quad (22)$$

The $d_{11}$ in the equations (17) to (20) is the path length between the GW station 70(1) and the FL antenna 211(1), and the $\Delta d_{21}$ in the equations (17) to (22) is the path length difference (path difference) between the GW station 70(1) and each of the FL antennas 211(1) and 211(2). The path length between the GW station 70(1) and the FL antenna 211(2) is expressed by $d_{11}+\Delta d_{21}$.

Since the following equation (23) holds from the difference between the equations (21) and (22), the path difference $\Delta d_{21}$ can be obtained by the following equation (24). The path difference $\Delta d_{21}$ consists of a constant part ($c/2\pi (f_1'-f_1)$) and a measurement part ($\Delta\theta'_{21}-\Delta\theta_{21}$). The $\Delta\theta_{21}$ is the phase difference between the phase $\theta_{21}$ of $h_{21}$ and the phase $\theta_{11}$ of $h_{11}$, and the $\Delta\theta'_{21}$ is the phase difference between the phase $\theta'_{21}$ of $h_{21}'$ and the phase $\theta'_{11}$ of $h_{11}'$. The measurement part ($\Delta\theta'_{21}-\Delta\theta_{21}$) is the difference between the phase difference $\Delta\theta_{21}$ and the phase difference $\Delta\theta'_{21}$.

$$e^{j2\pi(f_1-f_1')\frac{\Delta d_{21}}{c}} = e^{j(\theta_{21}-\theta_{11}-\theta'_{21}+\theta'_{11})} \quad (23)$$

$$\Delta d_{21} = \frac{c}{2\pi(f_1'-f_1)}(\Delta\theta'_{21} - \Delta\theta_{21}) \quad (24)$$

The path difference $\Delta d_{31}$ between the GW station 70(1) and each of the FL antennas 211(1) and 211(3) and the other path differences $\Delta d_{12}$, $\Delta d_{13}$, $\Delta d_{23}$, and $\Delta d_{32}$ can be obtained in the same manner. A general equation for the path difference $\Delta d_{ji}$ is the following equation (25).

$$\Delta d_{ji} = \frac{c}{2\pi(f_i'-f_i)}(\Delta\theta'_{ji} - \Delta\theta_{ji}) \quad (25)$$

$$\begin{pmatrix} \theta_{ji} = \angle h_{ji} \\ \theta'_{ji} = \angle h'_{ji} \\ \Delta\theta_{ji} = \theta_{ji} - \theta_{ii} \\ \Delta\theta'_{ji} = \theta'_{ji} - \theta'_{ii} \end{pmatrix}$$

In the case of propagation in a line-of-sight environment (LOS: Line-Of-Sight) without obstacles of the radio section of the feeder link between the drone 20 and the GW station 70 in the plural-GW system of the present embodiment, using the path difference $\Delta d_{ji}$ ($\Delta$d21, $\Delta$d31, $\Delta$d12, $\Delta$d13, $\Delta$d23, $\Delta$d32), a propagation path response at an arbitrary frequency f (for example, center frequency fsc) in the transmission signal band of the feeder link can be estimated, for example, as $H_F(f)$ in the following equation (26).

$$H_F(f) = \begin{bmatrix} |h_{11}(f_1)| & |h_{12}(f_2)|e^{j2\pi f \frac{\Delta d_{12}}{c}} & |h_{13}(f_3)|e^{j2\pi f \frac{\Delta d_{13}}{c}} \\ |h_{21}(f_1)|e^{j2\pi f \frac{\Delta d_{21}}{c}} & |h_{22}(f_2)| & |h_{23}(f_3)|e^{j2\pi f \frac{\Delta d_{23}}{c}} \\ |h_{31}(f_1)|e^{j2\pi f \frac{\Delta d_{31}}{c}} & |h_{32}(f_2)|e^{j2\pi f \frac{\Delta d_{12}}{c}} & |h_{33}(f_3)| \end{bmatrix} \quad (26)$$

By obtaining the reception weight W and the transmission weight W based on the estimation result of the propagation path response $H_F(f)$ and applying them to the reception signal and the transmission signal respectively, it is possible to reduce interference of the forward link and the reverse link between the GW stations (between the feeder links).

It is noted that, using the matrix of propagation path response, the weight W used in the interference canceller can be calculated, for example, by the ZF (Zero-Forcing) method or the MMSE (Minimum Mean Square Error) method using the matrix of propagation path response.

For example, in the ZF method, the weight W can be obtained from the inverse matrix of the matrix $H_{fc}$ (=$H_F(f)$) of the propagation path response as shown in the following equation (27).

$$W = H_{fc}^{-1} \quad (27)$$

In the MMSE method, the weight W can be used by the following equation (28). Herein, $N_T$ is the number of transmission antennas, and $\gamma$ is the SNR.

$$W = \left(H_{fc}^H H_{fc} + \frac{N_T I_{N_T}}{\gamma}\right)^{-1} H_{fc}^H \quad (28)$$

By using the weight W, the interference canceller section 220 can, for example, convert the reception signal Y of the following equation (29) into a demodulation signal E of the following equation (30) in which the interference signal is cancelled, and output it. The interference canceller section 220 stores the value of each element of the matrix of weight W in the equation (30) as data in the W table.

$$Y = \begin{bmatrix} y_1 \\ y_2 \\ y_3 \end{bmatrix} = \begin{bmatrix} h_{11}s_1 + h_{12}s_2 + h_{13}s_3 \\ h_{21}s_1 + h_{22}s_2 + h_{23}s_3 \\ h_{31}s_1 + h_{32}s_2 + h_{33}s_3 \end{bmatrix} \quad (29)$$

$$E = WY \quad (30)$$

$$\begin{bmatrix} e_1 \\ e_2 \\ e_3 \end{bmatrix} = \begin{bmatrix} 1 & \Delta h_{12} & \Delta h_{13} \\ \Delta h_{21} & 1 & \Delta h_{23} \\ \Delta h_{31} & \Delta h_{32} & 1 \end{bmatrix}^{-1} \begin{bmatrix} y_1 \\ y_2 \\ y_3 \end{bmatrix}$$

Herein, since the path differences $\Delta d_{ji}$ ($\Delta d_{21}$, $\Delta d_{31}$, $\Delta d_{12}$, $\Delta d_{13}$, $\Delta d_{23}$, $\Delta d_{32}$) are included in the propagation path response $H_{fc}$ (=$H_F(f)$) used when obtaining the weight W, the measurement accuracy, that is, the estimation accuracy, of the path difference $\Delta d_{ji}$ is directly linked to the interference reduction capability.

For example, the part of the phase difference corresponding to the path difference $\Delta d_{21}$ of the propagation path response $H_F(f)$ in the equation (26) consists of a constant part ($f/(f_1'-f_1)$) and a measurement part ($\Delta\theta'_{21}-\Delta\theta_{21}$) as shown in the following equation (31). Expressed in a general equation, a part of the phase difference corresponding to the path difference $\Delta d_{ji}$ of the propagation path response $H_F(f)$ consists of a constant part ($f/(f_i'-f_i)$) and a measurement part ($\Delta\theta'_{ji}-\Delta\theta_{ji}$) as shown in the following equation (32).

$$\frac{2\pi f \Delta d_{21}}{c} = \frac{f}{f_1' - f_1}(\Delta \theta_{21}' - \Delta \theta_{21}) \quad (31)$$

$$\frac{2\pi f \Delta d_{ji}}{c} = \frac{f}{f_i' - f_i}(\Delta \theta_{ji}' - \Delta \theta_{ji}) \quad (32)$$

In the equation (31), for example, assuming that the frequency f within the transmission signal band of the feeder link is 29 [GHz] and the transmission signal band is 20 [MHz], the constant part ($f/(f_1'-f_1)$) is about 1500. Assuming that the measurement error of the measurement part ($\Delta\theta_{21}'-\Delta\theta_{21}$) is 0.1 [degrees], the error of the phase difference becomes 150 [degrees], and the capability to reduce an interference of the forward and reverse links between the GW stations (between the feeder links) may deteriorate, and the communication quality of the feeder links may deteriorate.

Therefore, in the interference canceller section 220 of the drone 20 of the present embodiment, by reusing the plural pilot reception signals extracted from the reception signals received from the GW stations 70(1) to 70(3) to correct the path difference $\Delta d_{ji}$ (j≠i), the accuracy of the propagation path response $H_{fc}$ (=$H_F(f)$) used when obtaining the weight W is improved, and the deterioration of communication quality due to the estimation errors of the plural path differences $\Delta d_{ji}$ is prevented.

The interference canceller section 220, for example, performs the correction of the path difference $\Delta d_{ji}$ by the following procedures A1 to A3.

A1. Estimate the plural first path differences $\Delta d_{ji}$ ($\Delta d_{21}$, $\Delta d_{31}$, $\Delta d_{12}$, $\Delta d_{13}$, $\Delta d_{23}$, and $\Delta d_{32}$) between each of the plural GW stations 70(1) to 70(3) and the plural FL antennas 211(1) to 211(3) with reference to the main path described above.

A2. Obtain plural correction values $x_{ji}$ ($x_{21}$, $x_{31}$, $x_{12}$, $x_{13}$, $x_{23}$, $x_{32}$) respectively corresponding to the plural first path differences $\Delta d_{ji}$, based on the plural pilot reception signals described above.

A3. Estimate the propagation path response $H_F(f)$ in the transmission signal band of the feeder link, based on the plural corrected second path differences $\Delta d_{ji\_new}$ ($\Delta d_{21\_new}$, $\Delta d_{31\_new}$, $\Delta d_{12\_new}$, $\Delta d_{13\_new}$, $\Delta d_{23\_new}$, $\Delta d_{32\_new}$) obtained by respectively correcting the plural first path differences with the plural correction values $x_{ji}$, as shown in the following equation (33).

$$\Delta d_{ji\_new} = \Delta d_{ji} + x_{ji} \quad (33)$$

The propagation path response $H_F(f)$ corrected for the measurement error of the path difference can be estimated using the second path difference $\Delta d_{ji\_new}$ ($\Delta d_{21\_new}$, $\Delta d_{31\_new}$, $\Delta d_{12\_new}$, $\Delta d_{13\_new}$, $\Delta d_{23\_new}$, $\Delta d_{32\_new}$) shown in equation (33) instead of the first path difference $\Delta d_{ji}$ ($\Delta d_{21}$, $\Delta d_{31}$, $\Delta d_{12}$, $\Delta d_{13}$, $\Delta d_{23}$, and $\Delta d_{32}$) in equation (26) described above. Based on the estimation result of the propagation path response estimated using the corrected second path difference $\Delta d_{ji\_new}$, the above-described plural weights W are calculated and stored.

Figure 15:
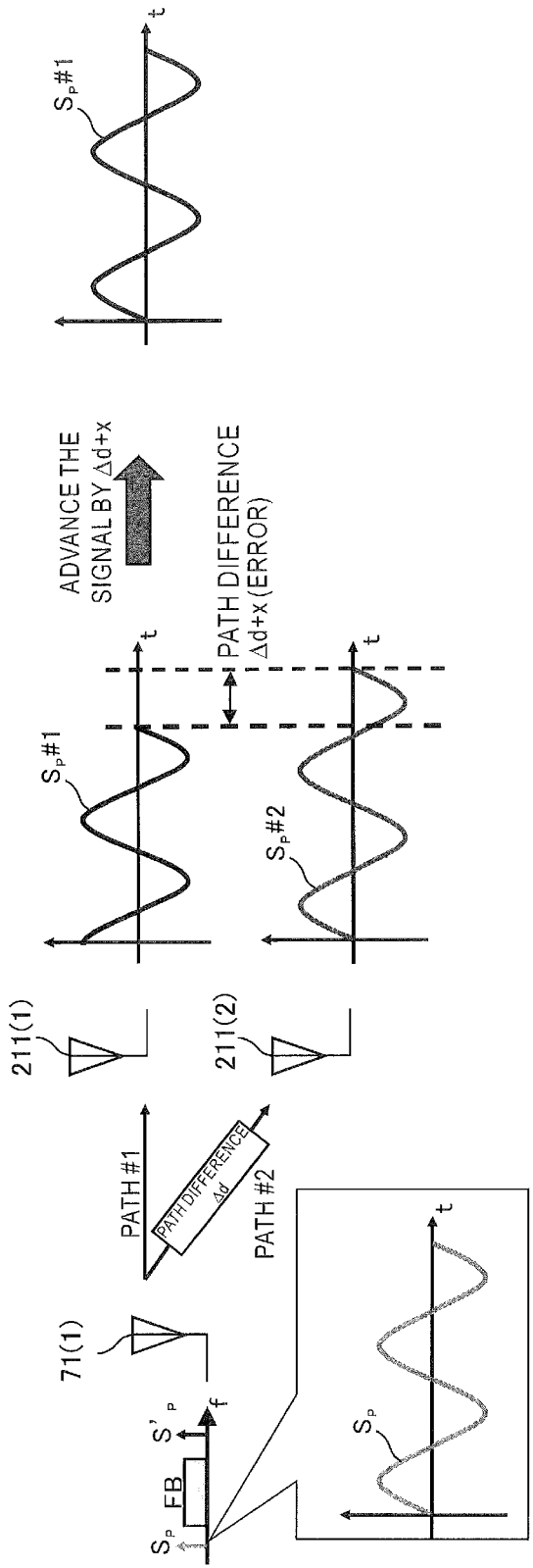
FIG. 15 is an illustration showing an example of path difference correction of a pilot reception signal in a drone-radio relay apparatus according to an embodiment.

FIG. 15 is an illustration showing an example of the path difference correction of the pilot reception signals in the drone-radio relay apparatus 20 according to the embodiment. It is noted that, in the example of FIG. 15 (the same applies to FIG. 16 to FIG. 18 described below), an example is shown in which the pilot signal $S_P$ transmitted from the first GW antenna 71(1) of the GW station 70(1) propagates along path #1 and is received by the first FL antenna 211(1) of the drone 20, and propagates along path #2 and is received by the second FL antenna 211(2) of the drone 20. There is a path difference $\Delta d$ between path #1 and path #2. The pilot reception signal $S_P$ #1 received by the first FL antenna 211(1) and the pilot reception signal SP #2 received by the second FL antenna 211(2) have a phase difference corresponding to a first path difference $\Delta d$+x, which is the path difference $\Delta d$ added with a measurement error x.

In FIG. 15, for example, while changing the phase of the pilot reception signal $S_P$ #1, the difference between the two pilot reception signals $S_P$ #1' and $S_P$ #2 can be obtained, and a correction value x for the first path difference $\Delta d$+x can be obtained based on the phase $\Delta d$+x when the foregoing difference between the two pilot reception signals is minimized. That is, while changing the phase of the pilot reception signal $S_P$ #1, it is searched of the x at which the two pilot reception signals $S_P$ #1 and $S_P$ #2 match. By correcting the first path difference $\Delta d$+x with the correction value x found in this way, it is possible to estimate the second path difference $\Delta d$ without the error x or with the error x reduced.

It is noted that, in the example of FIG. 15, although the correction value x is searched while changing the phase of the pilot reception signal $S_P$ #1, the correction value x may be searched while changing the phase of the other pilot reception signal SP #2.

Figure 16:
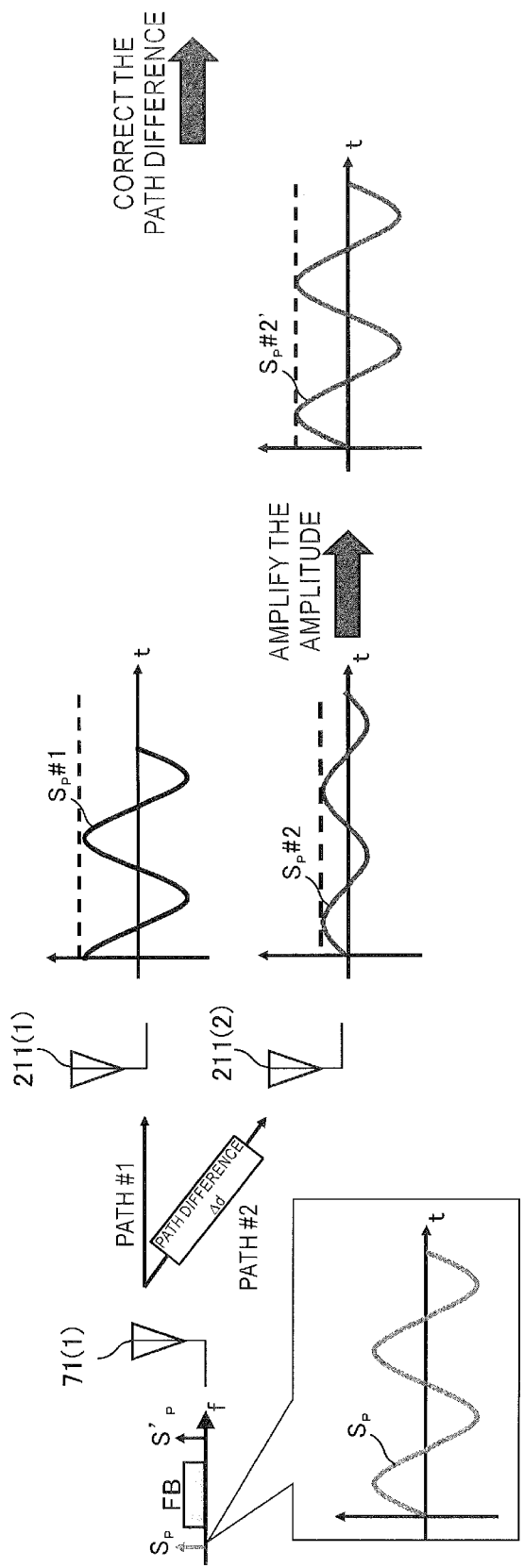
FIG. 16 is an illustration showing an example of amplitude correction of a pilot reception signal in a drone-radio relay apparatus according to an embodiment.

FIG. 16 is an illustration showing an example of amplitude correction of the pilot reception signal in the drone-radio relay apparatus 20 according to the embodiment. Since there is a reception level difference due to the antenna gain pattern between the plural FL antennas 211(1) and 211(2) of the drone 20, the amplitudes of the two pilot reception signals $S_P$ #1 and $S_P$ #2 are different, and there is a possibility that the correction value x of the path difference cannot be found with high accuracy.

Therefore, in the example of FIG. 16, among the plural FL antenna 211(1) and FL antenna 211(2) of the drone 20, the pilot reception signal $S_P$ #2 with a low reception level received by the FL antenna 211(2) is amplified, and an amplitude correction is performed to match the amplitudes of the two pilot reception signals $S_P$ #1 and $S_P$ #2'. By performing above-described path difference correction in FIG. 15 for the pilot reception signals $S_P$ #1 and $S_P$ #2' whose amplitudes have been aligned by this amplitude correction, the correction value x of the path difference can be found with high accuracy.

Figure 17:
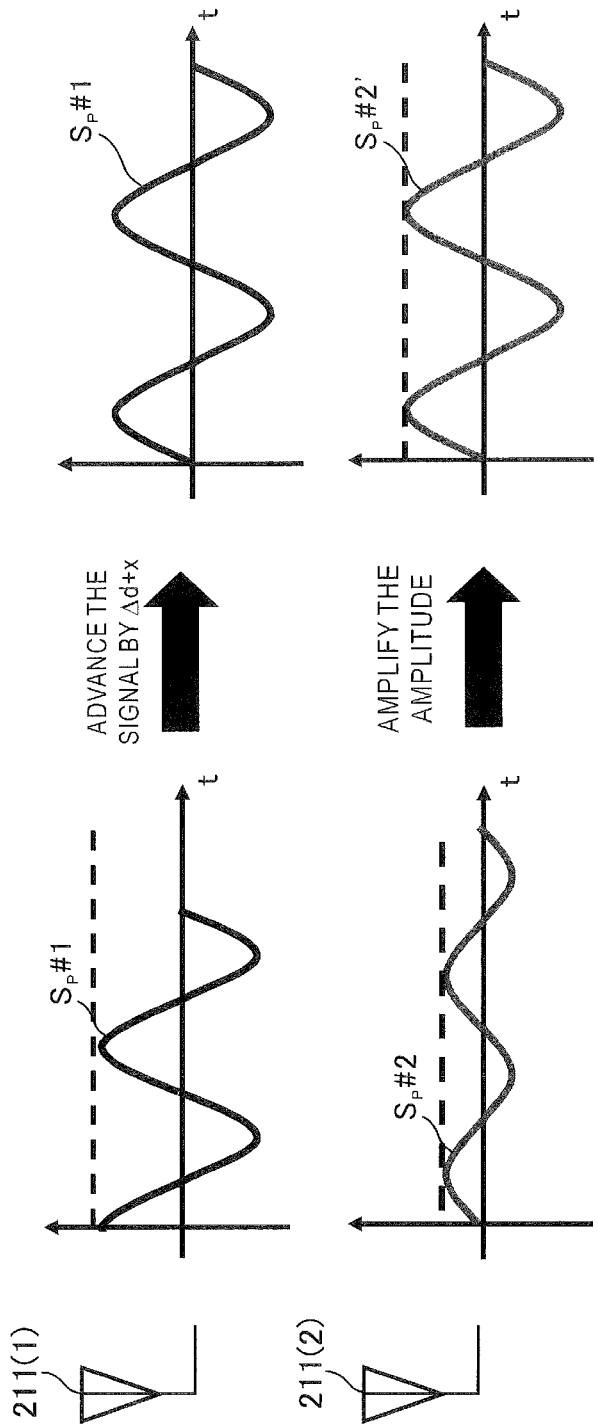
FIG. 17 is an illustration showing an example of simultaneous correction of path difference and amplitude of a pilot reception signal in a drone-radio relay apparatus according to an embodiment.

FIG. 17 is an illustration showing an example of simultaneous correction of the path difference and the amplitude of the pilot reception signal in the drone-radio relay apparatus 20 according to the embodiment. In the example of FIG. 17, while amplifying pilot reception signal $S_P$ #2 with a low reception level received by the FL antenna 211(2) and changing the phase of pilot reception signal $S_P$ #1 received by the FL antenna 211(1), an x (x in which two pilot reception signals $S_P$ #1' and $S_P$ #2' match) that minimizes the difference between the two pilot reception signals $S_P$ #1' and SP #2' is searched. In this example as well, the correction value x of the path difference can be found with high accuracy.

Figure 18:
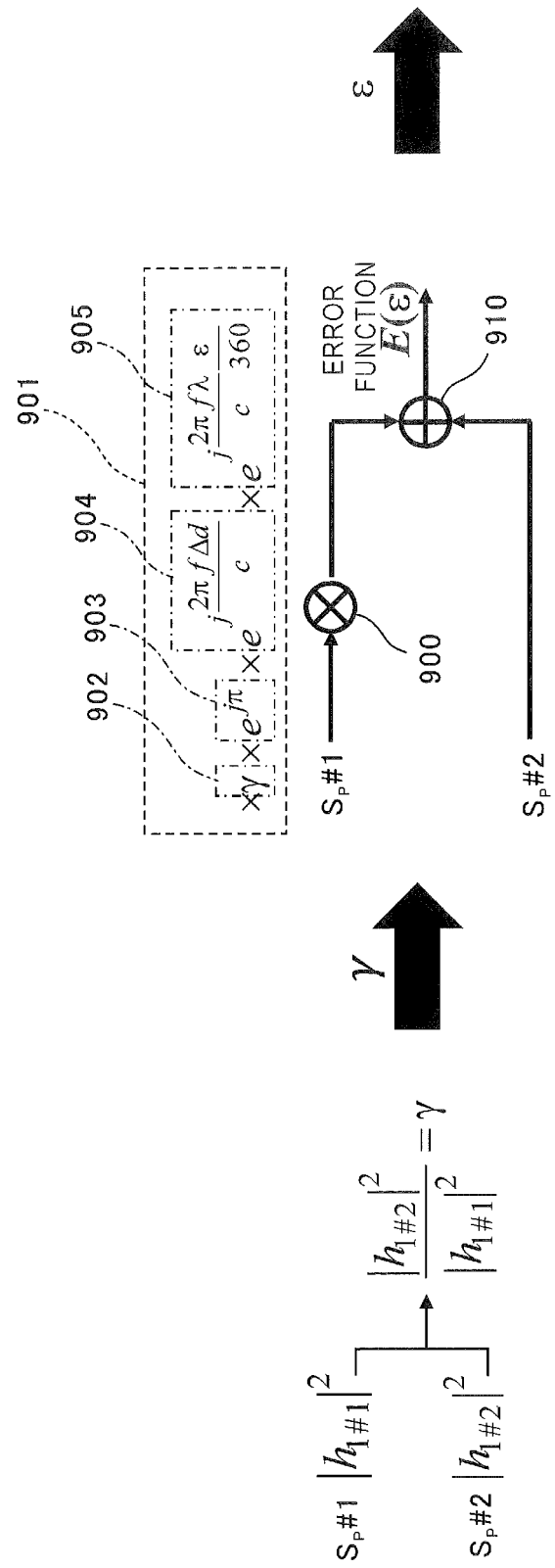
FIG. 18 is a block diagram showing an example of simultaneous correction of path difference and amplitude using an error function of a pilot reception signal in a drone-radio relay apparatus according to an embodiment.

FIG. 18 is a block diagram showing an example of simultaneous correction of path difference and amplitude using an error function $E(\varepsilon)$ of 17 pilot reception signals in the drone-radio relay apparatus according to the embodiment.

In FIG. 18, first, as shown in the following equation (34), a ratio $\gamma$ (=$|h_{1\,\#2}|^2/|h_{1\,\#2}|$) of the amplitudes (power amplitudes) of the two pilot reception signals $S_P$ #1 and $S_P$ #2 ($h_{1\,\#i}$ and $h_{1\,\#2}$) is calculated.

$$\frac{|h_{1\#2}|^2}{|h_{1\#1}|^2} = \gamma \qquad (34)$$

A multiplier 900 in the figure generates an intermediate signal corrected by multiplying the pilot reception signal Sp #1 by a correction coefficient 901 as shown in the following equation (35). The correction coefficient 901 is composed of a first correction coefficient 902 to a fourth correction coefficient 905. The first correction coefficient 902 is a correction coefficient for correcting the amplitude by multiplying one pilot reception signal Sp #1 by the ratio y so that the amplitudes of the two pilot reception signals Sp #1 and Sp #2 are equal. The second correction coefficient 903 is a correction coefficient for phase inversion that makes the sign minus so that it becomes a subtraction when added to the other pilot reception signal Sp #2 in a post-stage adder 910. The third correction coefficient 904 is a correction coefficient for advancing or delaying the pilot reception signal Sp #1 by the phase corresponding to the estimated first path difference Δd. The fourth correction coefficient 905 is a correction coefficient for advancing or delaying the pilot reception signal Sp #1 by a correction angle ε that is a correction value for the phase difference to be searched.

$$\times \gamma \times e^{j\pi} \times e^{j\frac{2\pi f \Delta d}{c}} \times e^{j\frac{2\pi f \lambda}{c} \frac{\varepsilon}{360}} \qquad (35)$$

The adder 910 outputs an error function E(ε) consisting of the function of the correction value (correction angle) ε of the phase difference, by adding an intermediate signal of pilot reception signal $S_P$ #1 output from multiplier 900 and the other pilot reception signal $S_P$ #2. A correction value x (=$\lambda_{P1}\varepsilon/360$) for the first path difference Δd is obtained based on the correction angle ε when the value of the error function E(ε) is minimized. The corrected second path difference $\Delta d_{21\_new}$ is estimated by the correction value x obtained using the correction angle ε.

The estimation of the correction value x (correction angle ε) and the corrected second path difference $\Delta d_{21\_new}$ as shown above is also performed for the other first path differences $\Delta d_{31}$, $\Delta d_{12}$, $\Delta d_{13}$, $\Delta d_{23}$, and $\Delta d_{32}$. A general expression of the corrected second path difference $\Delta d_{ji\_new}$ estimated by correcting the plural first path differences $\Delta d_{ji}$ can be expressed as the following equation (36). The second term on the right side of the equation (36) is the correction value $x_{ji}$ ($x_{21}$, $x_{31}$, $x_{12}$, $x_{13}$, $x_{23}$, $x_{32}$).

$$\Delta d_{ji\_new} = \Delta d_{ji} + \frac{\lambda_{Pi}\varepsilon_{ji}}{360} \qquad (36)$$

In the example of FIG. 18, although the intermediate signal is generated for the pilot reception signal $S_P$ #1, an intermediate signal may be generated for the pilot reception signal $S_P$ #2, and the error function E(ε) may be output by adding the intermediate signal for the pilot reception signal $S_P$ #2 and the pilot reception signal $S_P$ #1.

Figure 19:
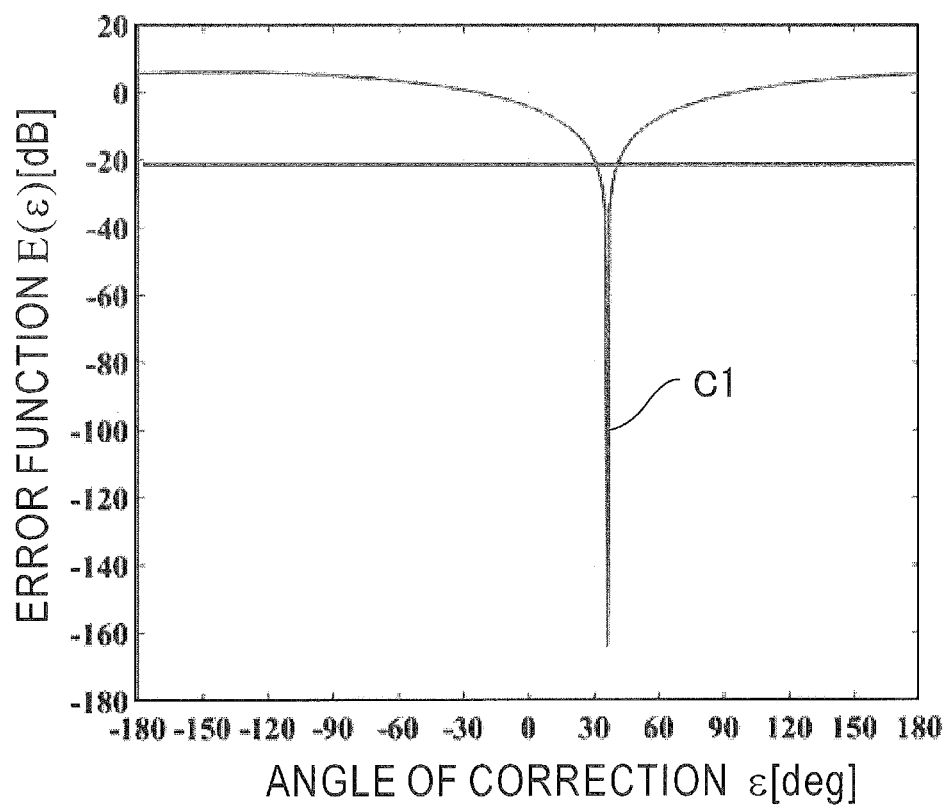
FIG. 19 is a graph showing an example of a computer simulation result of a relationship between a correction angle of the path difference of the pilot reception signal and a value of the error function.

FIG. 19 is a graph showing an example of a computer simulation result of the relationship between the correction angle of the path difference of the pilot reception signal and the value of the error function when the path difference Δd of the pilot reception signal is assumed to be 10 [mm]. The horizontal axis in FIG. 19 is the correction angle ε for the path difference Δd (10 [mm]) of the pilot reception signal in FIG. 18 described above. The vertical axis in FIG. 19 represents values obtained by calculating the above-described error function E in FIG. 18 described above with a frequency of 2 [GHz]. As shown in FIG. 19, the range to be scanned while changing the correction angle ε when searching for the correction value x may be a predetermined angular range around the pre-estimated first path difference Δd in order to shorten the search time for searching for the correction value x. This predetermined angle range may be set to an initial setting range (for example, −180 [degree] to +180 [degree]) that covers all angles so that the correction value x can be reliably searched when the operation of the plural-GW system of the present embodiment is started, and may be set to a narrower range (for example, −60 [degrees] to +60 [degrees], −90 [degrees] to +90 [degrees], etc.) than the initial set range in order to shorten the search time during normal operation.

In order to avoid false search of the correction value x, for example, as shown in curve C1 in FIG. 19, a correction value x for the first path difference Δd may be obtained based on the correction angle ε when the value of the error function E(ε) is minimized under a condition smaller than a predetermined threshold value (e.g. −20 dB).

Figure 20:
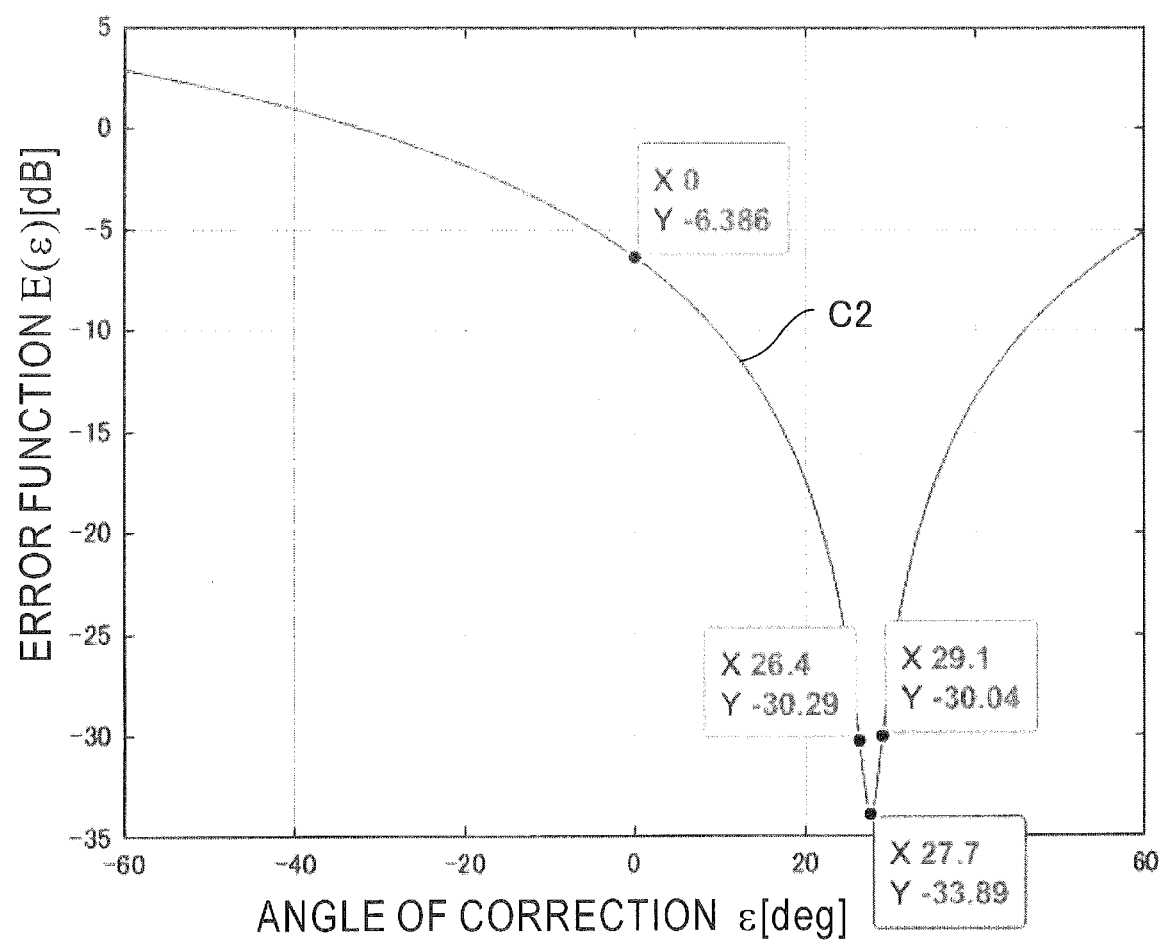
FIG. 20 is a graph showing an example of a relationship between a correction angle of the path difference of the pilot reception signal and a measured value of the error function.

FIG. 20 is a graph showing an example of a relationship between the correction angle ε of the path difference Δd of the pilot reception signal and the measured value C2 of the error function E. The horizontal axis in FIG. 20 is the correction angle ε for the path difference Δd (measured value: 9.5 [mm]) of the pilot reception signal in FIG. 18 described above. The vertical axis in FIG. 20 is the measured value obtained by measuring the error function E in FIG. 18 described above. The frequency used for the measurement is 2 [GHz]. As shown in FIG. 20, the interference reduction was 6 [dB] when the first path difference Δd of the pilot reception signal was not corrected, but a high interference reduction of about 30 [dB] was obtained when the first path difference Δd of the present embodiment was corrected.

It is noted that the plural correction values $x_{ji}$ respectively corresponding to the plural first path differences $\Delta d_{ji}$ may be obtained and stored at predetermined correction timings. Herein, the correction timing may be preset periodic or non-periodic timing (for example, every predetermined time such as 0.1 [ms] to 10 [ms], or, for each number of times the pilot signals received periodically). Further, the correction timing may be a timing when it is detected that the communication quality of the feeder link has deteriorated below a predetermined threshold.

Figure 21:
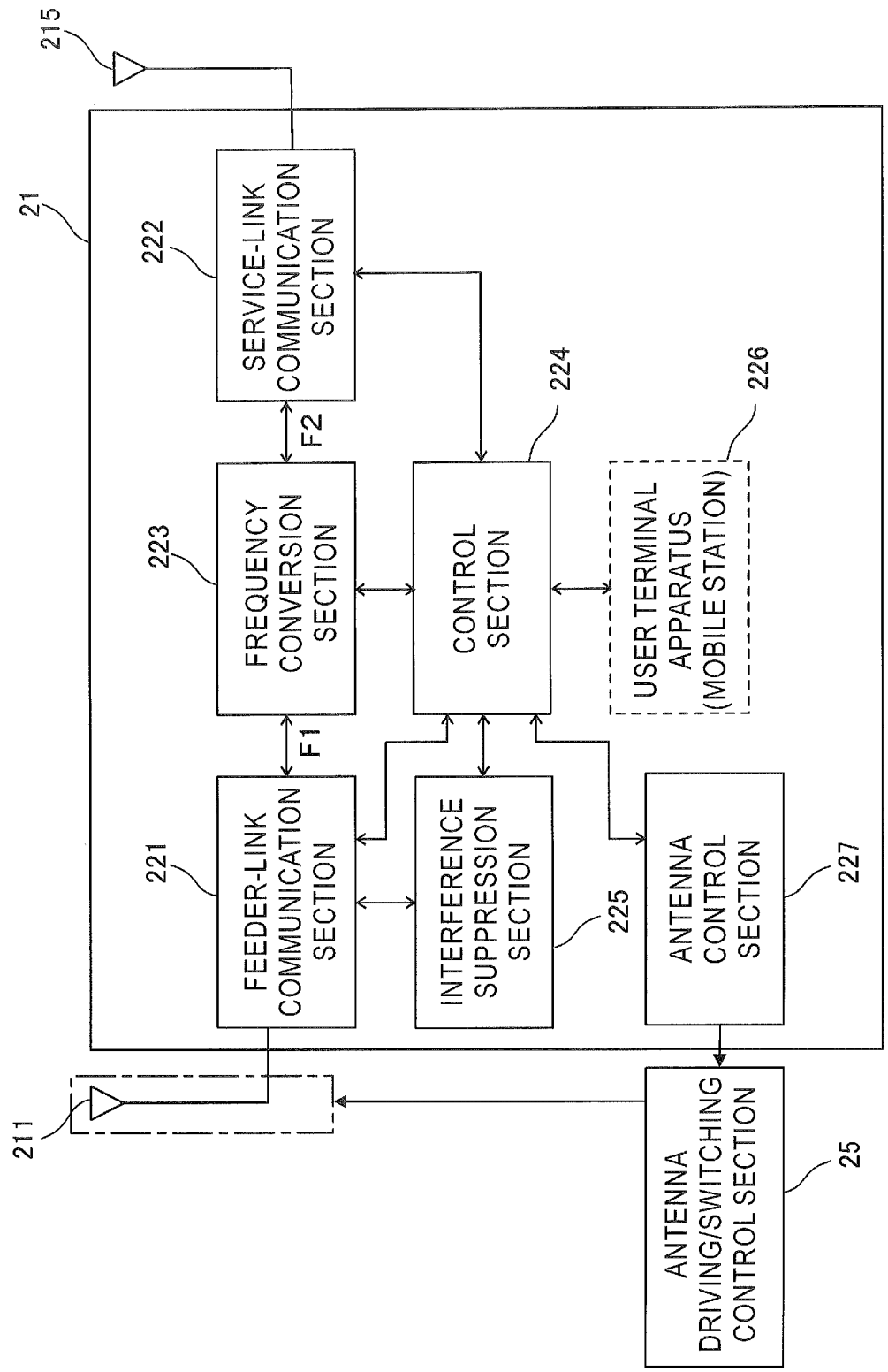
FIG. 21 is an illustration showing an example of a main configuration of a relay communication station of a drone-radio relay apparatus according to an embodiment.

FIG. 21 is an illustration showing an example of a main configuration of the relay communication station 21 of the drone 20 according to the present embodiment. In FIG. 21, the relay communication station 21 is provided with a feeder-link communication section 221, a service-link communication section 222, a frequency conversion section 223, a control section 224 for controlling each section, and an interference suppression section 225.

The feeder-link communication section 221 is provided with plural receivers corresponding to the number of GW stations 70 (the number of FL antennas 211), and transmits/receives a radio signal of the first frequency F1 for feeder link to/from the GW station 70 via the FL antenna 211.

The plural receivers of the feeder-link communication section 221 receive plural pilot signals transmitted from each of the plural GW stations 70(1) to 70(3), and separate pilot signal groups in which plural pilot signals are duplicated by a filter. Each receiver outputs plural pilot signals separated by the filter to the interference suppression section 225 as a reception result of the pilot signals $h_{ki}$ propagated through the propagation path of the feeder link.

The service-link communication section 222 transmits and receives radio signals of a second frequency F2 for the service link to and from the terminal apparatus 61 via an antenna for service link 115. The frequency conversion section 223 performs a frequency conversion between the first frequency F1 and the second frequency F2, between the feeder-link communication section 221 and the service-link communication section 222. The radio signals relayed by the relay communication station 21 may be transmitted and received, for example, by using the OFMDA communication method conforming to the LTE or LTE-Advanced standard. In this case, good communication quality can be maintained even if multipaths with different radio signal delays occur.

The control section 224 can control each section by executing a pre-installed program. Particularly, in the present embodiment, the control section 224 also functions as means for changing a mutual positional relationship between the plural FL antennas 211(1) to 211(3), based on a comparison result between a correlation index value indicating the degree of propagation spatial correlation of the plural feeder links and a predetermined threshold. For example, the above-described antenna driving/switching control is performed in cooperation with an antenna driving/switching section 25 on the HAPS main body side.

The interference suppression section 225 performs the above-described estimation of the propagation path response, the calculation of the weight and the interference-cancellation signal process based on the reception results ($h_{ki}$) of the plural pilot signals that are output from the feeder-link communication section 221, by executing a pre-installed program.

The interference suppression section 225 also functions as means for performing the following B1 to B7138 by executing a preinstalled program.

B1. Means for retrieving plural pilot reception signals corresponding to plural pilot signals transmitted respectively from the plural GW stations 70(1) to 70(3) in a frequency band adjacently outside the transmission signal band of the feeder link, from the reception signals received via the plural FL antennas 211(1) to 211(3).

B2. Means for estimating plural first path differences between each of the plural GW stations 70(1) to 70(3) and the plural FL antennas 211(1) to 211(3) with reference to the main path, based on the plural pilot reception signals.

B3. Means for obtaining plural correction values $x_{ji}$ respectively corresponding to the plural first path differences $d_{ji}$, based on the plural pilot reception signals.

B4. Means for estimating a propagation path response $H_F(f)$ in the transmission signal band of the feeder link, based on plural corrected second path differences $\Delta_{ji\_new}$ obtained by respectively correcting the plural first path differences $d_{ji}$ with the plural correction values $x_{ji}$.

B5. Means for calculating and storing plural transmission weights W, reception weights W, or both, based on the estimation result of the propagation path response $H_F(f)$, with respect to each of the plural GW stations 70(1) to 70(3).

B6. Means for applying plural reception weights W to reception signals received via the plural FL antennas 211(1) to 211(3), with respect to each of the plural GW stations 70(1) to 70(3).

B7. Means for applying plural transmission weights W to transmission signals to be transmitted via the plural FL antennas 211(1) to 211(3), with respect to each of the plural GW stations 70(1) to 70(3).

It is noted that, when receiving control information from a remote control apparatus (control source) of the communication operator of the mobile communication network or transmitting information to the remote control apparatus, a user terminal (mobile station) 226 connected to the control section 224 may be provided. The control section 224, for example, may receive control information transmitted from the remote control apparatus by the user terminal (mobile station) 226 and control each section based on the control information. Herein, the communication between the remote control apparatus and the user terminal (mobile station) 226 may be performed using, for example, the IP address (or telephone number) assigned to each of the remote control apparatus and the user terminal (mobile station) 226.

As described above, according to the present embodiment, it is possible to dynamically suppress the interference between the plural feeder links in the multi-feeder links of the same frequency, between the drone 20 and the plural GW stations 70(1) to 70(3) in the plural-GW system.

In particular, according to the present embodiment, it is possible to prevent a deterioration of communication quality due to estimation errors of the plural path differences between the plural FL antennas 211(1) to 211(3) and the plural GW stations 70(1) to 70(3) connected to the relay communication station 21 incorporated in the drone 20 in the plural-GW system.

It is noted that, the process steps and configuration elements of the relay communication station of the communication relay apparatus such as the HAPS, the feeder station, the gateway station, the management apparatus, the monitoring apparatus, the remote control apparatus, the server, the terminal apparatus (user apparatus, mobile station, communication terminal), the base station and the base station apparatus described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, gateway station, base station, base station apparatus, radio-relay station apparatus, terminal apparatus (user apparatus, mobile station, communication terminal), management apparatus, monitoring apparatus, remote control apparatus, server, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 20 drone-type communication relay apparatus (drone-radio relay apparatus, drone)
21 relay communication station
61 terminal apparatus
70, 70(1) to 70(3) gateway station (GW station)
71, 71(1) to 71(3) antenna for feeder link (GW antenna)
200C three dimensional cell
200F foot print
211, 211(1) to 211(3) antenna for feeder link (FL antenna)
215 antenna for service link (SL antenna)
220 interference canceller section
221 feeder-link communication section
222 service-link communication section
223 frequency conversion section
224 control section
225 interference suppression section

The invention claimed is:

1. An aerial-staying type communication relay apparatus including a repeater-type relay communication station for relaying radio communication of a terminal apparatus and plural antennas for feeder link, comprising:
a feeder-link communication section for transmitting and receiving relay signals different from each other on a same frequency in a feeder link to and from plural gateway stations that are time-synchronized with each other, via plural antennas for feeder link; and
an interference suppression section for suppressing an interference between plural feeder links formed with the plural gateway stations,
wherein the interference suppression section comprises:
means for retrieving plural pilot reception signals corresponding to plural pilot signals transmitted respectively from the plural gateway stations in a frequency band adjacently outside a transmission signal band of the feeder link, from reception signals received via the plural antennas for feeder link;
means for estimating plural first path differences respectively between the plural gateway stations and the plural antennas for feeder link with reference to a main path, based on the plural pilot reception signals;
means for obtaining plural correction values respectively corresponding to the plural first path differences, based on the plural pilot reception signals;
means for estimating a propagation path response in the transmission signal band of the feeder link, based on plural corrected second path differences obtained by respectively correcting the plural first path differences with the plural correction values;
means for calculating and storing plural reception weights based on an estimation result of the propagation path response, with respect to each of the plural gateway stations; and
means for applying the plural reception weights to reception signals received via the plural antennas for feeder link, with respect to each of the plural gateway stations.

2. The communication relay apparatus according to claim 1, the interference suppression section, with respect to each of the plural gateway stations, calculates and stores plural reception weights and plural transmission weights based on the estimation result of the propagation path response, applies the plural reception weights to reception signals received via the plural antennas for feeder link, and applies the plural transmission weights to transmission signals to be transmitted via the plural antennas for feeder link.

3. An aerial-staying type communication relay apparatus including a repeater-type relay communication station for relaying radio communication of a terminal apparatus and plural antennas for feeder link, comprising:
a feeder-link communication section for transmitting and receiving relay signals different from each other on a same frequency in a feeder link to and from plural gateway stations that are time-synchronized with each other, via plural antennas for feeder link; and
an interference suppression section for suppressing an interference between plural feeder links formed with the plural gateway stations,
wherein the interference suppression section comprises:
means for retrieving plural pilot reception signals corresponding to plural pilot signals transmitted respectively from the plural gateway stations in a frequency band adjacently outside a transmission signal band of the feeder link, from reception signals received via the plural antennas for feeder link;
means for estimating plural first path differences respectively between the plural gateway stations and the plural antennas for feeder link with reference to a main path, based on the plural pilot reception signals;
means for obtaining plural correction values respectively corresponding to the plural first path differences, based on the plural pilot reception signals;
means for estimating a propagation path response in the transmission signal band of the feeder link based on plural corrected second path differences obtained by respectively correcting the plural first path differences with the plural correction values;

means for calculating and storing plural transmission weights based on an estimation result of the propagation path response, with respect to each of the plural gateway stations; and means for applying the plural transmission weights to transmission signals to be transmitted via the plural antennas for feeder link, with respect to ach of the plural gateway stations.

4. The communication relay apparatus according to claim 1, wherein the communication relay apparatus, with respect to each of the plural first path differences, obtains a difference between two pilot reception signals respectively corresponding to the main path and the other path of the first path difference, while changing a phase difference of one of the two pilot reception signals relative to the other pilot reception signal, and obtains a correction value corresponding to the first path difference based on the phase difference when the difference between the two pilot reception signals is minimized.

5. The communication relay apparatus according to claim 4, wherein the communication relay apparatus adjusts an amplitude of at least one of the two pilot reception signals so that amplitudes of the two pilot reception signals become a same value as each other.

6. The communication relay apparatus according to claim 5, when a frequency of the pilot reception signal is f [Hz], a wavelength of the pilot reception signal is λ [m], and the first path difference is Δd [m], a ratio of absolute values of the amplitudes of the two pilot reception signals is y, a correction angle of the phase difference to be changed is ε [degrees], and light velocity is c [m/s], wherein the communication relay apparatus obtains a value of error function E(ε) by adding the one pilot reception signal and the signal obtained by correcting the other pilot reception signal as shown in the following equation (1), and obtains the correction value corresponding to the first path difference based on the correction angle E of the phase difference when the value of the error function E(ε) is minimized $$\times \gamma \times e^{j\pi} \times e^{j\frac{2\pi f \Delta d}{c}} \times e^{j\frac{2\pi f \lambda}{c}\frac{\varepsilon}{360}}. \quad (1)$$

7. The communication relay apparatus according to claim 6, wherein the communication relay apparatus scans the correction angle E of the phase difference in a predetermined angle range centered on the first path difference, and obtains the correction value corresponding to the first path difference based on the correction angle E of the phase difference when the value of the error function E(ε) is minimized under a condition smaller than a predetermined threshold.

8. The communication relay apparatus according to claim 1, wherein the communication relay apparatus obtains and stores the plural correction values respectively corresponding to the plural first path differences based on the plural pilot reception signals, at a predetermined correction timing.

9. A system comprising:

the communication relay apparatus according to claim 1, and plural gateway stations that are time-synchronized with each other and that transmit and receive relay signals different from each other on the same frequency in a feeder link to and from the relay communication station of the aerial-staying type communication relay apparatus.

10. An interference suppression method of feeder links between a repeater-type relay communication station that is incorporated in an aerial-staying type communication relay apparatus and relays a radio communication of a terminal apparatus, and plural gateway stations that are time-synchronized with each other and transmit and receive relay signals different from each other on a same frequency, the method comprising:

retrieving plural pilot reception signals corresponding to plural pilot signals transmitted respectively from the plural gateway stations in a frequency band adjacently outside a transmission signal band of the feeder link, from reception signals received via plural antennas for feeder link;

estimating plural first path differences respectively between the plural gateway stations and the plural antennas for feeder link with reference to a main path, based on the plural pilot reception signals;

obtaining plural correction values respectively corresponding to the plural first path differences, based on the plural pilot reception signals;

estimating a propagation path response in the transmission signal band of the feeder link based on plural corrected second path differences obtained by respectively correcting the plural first path differences with the plural correction values;

calculating and storing plural reception weights based on an estimation result of the propagation path response, with respect to each of the plural gateway stations; and applying the plural reception weights to reception signals received via the plural antennas for feeder link, with respect to each of the plural gateway stations.

11. The interference suppression method according to the claim 10, comprising:

with respect to each of the plural gateway stations, calculating and storing plural reception weights and plural transmission weights based on the estimation result of the propagation path response; applying the plural reception weights to reception signals received via the plural antennas for feeder link; and applying the plural transmission weights to transmission signals to be transmitted via the plural antennas for feeder link.

12. An interference suppression method of feeder links between a repeater-type relay communication station that is incorporated in an aerial-staying type communication relay apparatus and relays a radio communication of a terminal apparatus, and plural gateway stations that are time-synchronized with each other and transmit and receive relay signals different from each other on a same frequency, the method comprising:

retrieving plural pilot reception signals corresponding to plural pilot signals transmitted respectively from the plural gateway stations in a frequency band adjacently outside a transmission signal band of the feeder link, from reception signals received via plural antennas for feeder link;

estimating plural first path differences respectively between the plural gateway stations and the plural antennas for feeder link with reference to a main path, based on the plural pilot reception signals;

obtaining plural correction values respectively corresponding to the plural first path differences, based on the plural pilot reception signals;

estimating a propagation path response in the transmission signal band of the feeder link based on plural corrected second path differences obtained by respectively correcting the plural first path differences with the plural correction values;

calculating and storing plural transmission weights based on an estimation result of the propagation path response, with respect to each of the plural gateway stations; and applying the plural transmission weights to transmission signals to be transmitted via the plural antennas for feeder link, with respect to each of the plural gateway stations.

13. A non-transitory computer readable medium containing software that is executed by a computer or a processor installed in an aerial-staying type communication relay apparatus having a repeater-type relay communication station for relaying a radio communication of a terminal apparatus and plural antennas for feeder link, the software comprising:

executable code that retrieves plural pilot reception signals corresponding to plural pilot signals transmitted respectively from the plural gateway stations in a frequency band adjacently outside a transmission signal band of a feeder link, from reception signals received via plural antennas for feeder link;

executable code that estimates plural first path differences respectively between the plural gateway stations and the plural antennas for feeder link with reference to a main path, based on the plural pilot reception signals;

executable code that obtains plural correction values respectively corresponding to the plural first path differences, based on the plural pilot reception signals;

executable code that estimates a propagation path response in the transmission signal band of the feeder link based on plural corrected second path differences obtained by respectively correcting the plural first path differences with the plural correction values;

executable code that calculates and stores plural reception weights based on an estimation result of the propagation path response, with respect to each of the plural gateway stations; and executable code that applies the plural reception weights to reception signals received via the plural antennas for feeder link, with respect to each of the plural gateway stations.

14. The non-transitory computer readable medium according to claim 13, comprising:

with respect to each of the plural gateway stations, the executable code that calculates and stores plural reception weights and plural transmission weights based on the estimation result of the propagation path response applies the plural reception weights to reception signals received via the plural antennas for feeder link and applies the plural transmission weights to transmission signals to be transmitted via the plural antennas for feeder link.

15. A non-transitory computer readable medium containing software that is executed by a computer or a processor installed in an aerial-staying type communication relay apparatus having a repeater-type relay communication station for relaying radio communication of a terminal apparatus and plural antennas for feeder link, the software comprising:

executable code that retrieves plural pilot reception signals corresponding to plural pilot signals transmitted respectively from the plural gateway stations in a frequency band adjacently outside a transmission signal band of a feeder link, from reception signals received via plural antennas for feeder link;

executable code that estimates plural first path differences respectively between the plural gateway stations and the plural antennas for feeder link with reference to a main path, based on the plural pilot reception signals;

executable code that obtains plural correction values respectively corresponding to the plural first path differences based on the plural pilot reception signals;

executable code that estimates a propagation path response in the transmission signal band of the feeder link based on plural corrected second path differences obtained by respectively correcting the plural first path differences with the plural correction values;

executable code that calculates and stores plural transmission weights based on an estimation result of the propagation path response, with respect to each of the plural gateway stations; and executable code that applies the plural transmission weights to transmission signals to be transmitted via the plural antennas for feeder link, with respect to each of the plural gateway stations.

16. The communication relay apparatus according to claim 3, wherein the communication relay apparatus, with respect to each of the plural first path differences, obtains a difference between two pilot reception signals respectively corresponding to the main path and the other path of the first path difference, while changing a phase difference of one of the two pilot reception signals relative to the other pilot reception signal, and obtains a correction value corresponding to the first path difference based on the phase difference when the difference between the two pilot reception signals is minimized.

17. The communication relay apparatus according to claim 16, wherein the communication relay apparatus adjusts an amplitude of at least one of the two pilot reception signals so that amplitudes of the two pilot reception signals become a same value as each other.

18. The communication relay apparatus according to claim 17, when a frequency of the pilot reception signal is f [Hz], a wavelength of the pilot reception signal is $\lambda$ [m], and the first path difference is $\Delta d$ [m], a ratio of absolute values of the amplitudes of the two pilot reception signals is y, a correction angle of the phase difference to be changed is $\varepsilon$ [degrees], and light velocity is c [m/s], wherein the communication relay apparatus obtains a value of error function $E(\varepsilon)$ by adding the one pilot reception signal and the signal obtained by correcting the other pilot reception signal as shown in the following equation (1), and obtains the correction value corresponding to the first path difference based on the correction angle E of the phase difference when the value of the error function E(ε) is minimized $$\times \gamma \times e^{j\pi} \times e^{j\frac{2\pi f \Delta d}{c}} \times e^{j\frac{2\pi f \lambda}{c} \frac{\varepsilon}{360}}. \quad (1)$$

19. The communication relay apparatus according to claim 17,
 wherein the communication relay apparatus scans the correction angle E of the phase difference in a predetermined angle range centered on the first path difference, and obtains the correction value corresponding to the first path difference based on the correction angle ε of the phase difference when the value of the error function E(ε) is minimized under a condition smaller than a predetermined threshold.

20. A system comprising:
 the communication relay apparatus according to claim 3, and
 plural gateway stations that are time-synchronized with each other and that transmit and receive relay signals different from each other on the same frequency in a feeder link to and from the relay communication station of the aerial-staying type communication relay apparatus.

\* \* \* \* \*